(12) United States Patent  
Yanagisawa et al.

(10) Patent No.: US 12,543,479 B2  
(45) Date of Patent: Feb. 3, 2026

(54) ORGANIC ELECTROLUMINESCENCE DISPLAY DEVICE

(71) Applicant: Magnolia White Corporation, Tokyo (JP)

(72) Inventors: Sho Yanagisawa, Tokyo (JP); Masato Ishikawa, Tokyo (JP); Tatsuya Nishino, Tokyo (JP); Hideyuki Takahashi, Tokyo (JP); Hiroshi Tabatake, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 406 days.

(21) Appl. No.: 18/099,261

(22) Filed: Jan. 20, 2023

(65) Prior Publication Data

US 2023/0284510 A1 Sep. 7, 2023

(30) Foreign Application Priority Data

Mar. 2, 2022 (JP) .................. 2022-032003

(51) Int. Cl.
*H10K 59/80* (2023.01)
*H10K 59/131* (2023.01)

(52) U.S. Cl.
CPC ....... *H10K 59/8723* (2023.02); *H10K 59/131* (2023.02); *H10K 59/8722* (2023.02)

(58) Field of Classification Search
CPC ............ H10K 59/8723; H10K 59/131; H10K 59/8722; H10K 71/166; H10K 59/352; H10K 59/88

See application file for complete search history.

(56) References Cited

U.S. PATENT DOCUMENTS

2018/0061728 A1* 3/2018 Chen ................. H10K 50/8426

FOREIGN PATENT DOCUMENTS

| JP | 2011-154797 A | 8/2011 |
| JP | 2017-210633 A | 11/2017 |

* cited by examiner

*Primary Examiner* — Elmito Breval
(74) *Attorney, Agent, or Firm* — XSENSUS LLP

(57) ABSTRACT

An organic electroluminescence display device includes a substrate including a first surface, a first area arranged on the first surface and including one or more first spacers and a plurality of pixels each including a light-emitting layer, a third area arranged on the first surface, surrounding the first area, and not including spacers, and a second area arranged on the first surface, surrounding the third area, and including one or more second spacers. The plurality of pixels each including the light-emitting layer is arranged along a first direction and a second direction intersecting the first direction, and a length of the third area in the second direction is a total length of pitches for at least two pixels.

15 Claims, 20 Drawing Sheets

ORGANIC ELECTROLUMINESCENCE DISPLAY DEVICE

CROSS-REFERENCE TO RELATED APPLICATIONS

This application claims the benefit of priority to Japanese Patent Application No. 2022-032003 filed on Mar. 2, 2022, the entire contents of which are incorporated herein by reference.

FIELD

An embodiment of the present invention relates to an organic electroluminescence display device.

BACKGROUND

In recent years, a display device (hereinafter, referred to as "organic EL display device") in which pixels are formed using an organic electroluminescent element (hereinafter, referred to as "organic EL element") is implemented as a display device such as a smart phone and a camera. In a manufacturing process of the organic EL display device, a vacuum deposition method is applied to form an organic EL element. In the vacuum deposition method, using a vapor deposition mask makes it possible to selectively form a thin film of a material of an organic EL element in a desired area of an organic EL display device, and to prevent the thin film from being formed in the other areas.

SUMMARY

An organic electroluminescence display device includes a substrate including a first surface, a first area arranged on the first surface and including one or more first spacers and a plurality of pixels each including a light-emitting layer, a third area arranged on the first surface, surrounding the first area, and not including spacers, and a second area arranged on the first surface, surrounding the third area, and including one or more second spacers. The plurality of pixels each including the light-emitting layer is arranged along a first direction and a second direction intersecting the first direction, and a length of the third area in the second direction is a total length of pitches for at least two pixels.

BRIEF DESCRIPTION OF DRAWINGS

FIG. 5.

DESCRIPTION OF EMBODIMENTS

Hereinafter, embodiments of the present invention will be described with reference to the drawings and the like. However, the present invention can be implemented in many different aspects, and should not be construed as being limited to the description of the embodiments exemplified below. In addition, although the drawings, the widths, thicknesses, shapes, configurations, and the like of the respective portions may be schematically represented in comparison with the actual embodiments for clarity of the description, the drawings are merely examples, and do not limit the interpretation of the present invention. In addition, in the embodiments of the present invention, elements similar to those described above with respect to the above-mentioned figures are denoted by the same symbols (or symbols denoted by a, b, and the like following a number) and a detailed description thereof may be omitted as appropriate. Further, the terms "first" and "second" appended to each element are convenience signs used to distinguish each element, and do not have any further meaning unless otherwise specified.

In the case where a member or area is "above (or below)" another member or area, it includes the case where it is directly above (or below) another member or area but also the case where it is above (or below) another member or area, i.e., the case where another component is included between above (or below) another member or area unless otherwise specified in the present specification.

In addition, a spacer is arranged on a substrate of an organic EL display device. In a manufacturing process of the organic EL display device, the contact between a vapor deposition mask and the substrate is minimized by using the spacer. On the other hand, the vapor deposition mask may be in strong contact with the spacer. When the vapor deposition mask strongly contacts the spacer, a thin film (hereinafter referred to as a "vapor deposition film") deposited on the spacer adheres to the vapor device, since the vapor deposition mask is repeatedly used, a vapor deposition film adhered to the vapor deposition mask may be peeled off and adhered to the organic EL display device. The deposition film deposited on the organic EL display device becomes a foreign matter on the organic EL display device. For example, since the foreign matter causes a display defect of the organic EL display device, a manufacturing yield of the organic EL display device decreases.

The present invention provides an organic EL display device capable of suppressing a decrease in manufacturing yield. For example, the present invention provides an organic EL display device capable of suppressing a decrease in manufacturing yield due to foreign matter on the organic EL display device.

An organic EL display device capable of suppressing a decrease in manufacturing yield will be exemplified in some embodiments described below.

First Embodiment

<1-1. Configuration of Organic EL Display Device 100>

Figure 1:
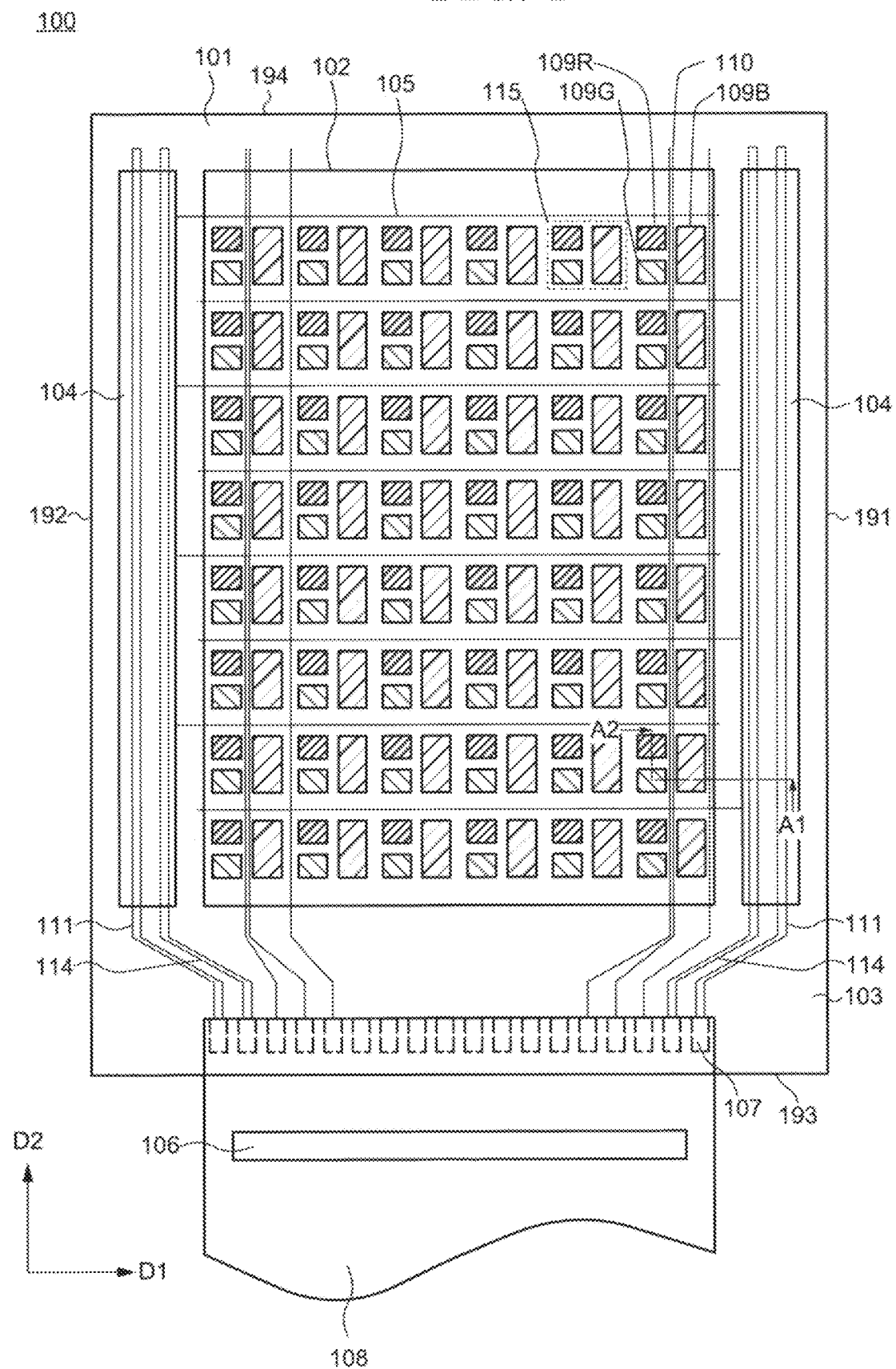
FIG. 1 is a schematic diagram showing a configuration of an organic EL display device according to a first embodiment of the present invention.
Figure 2:
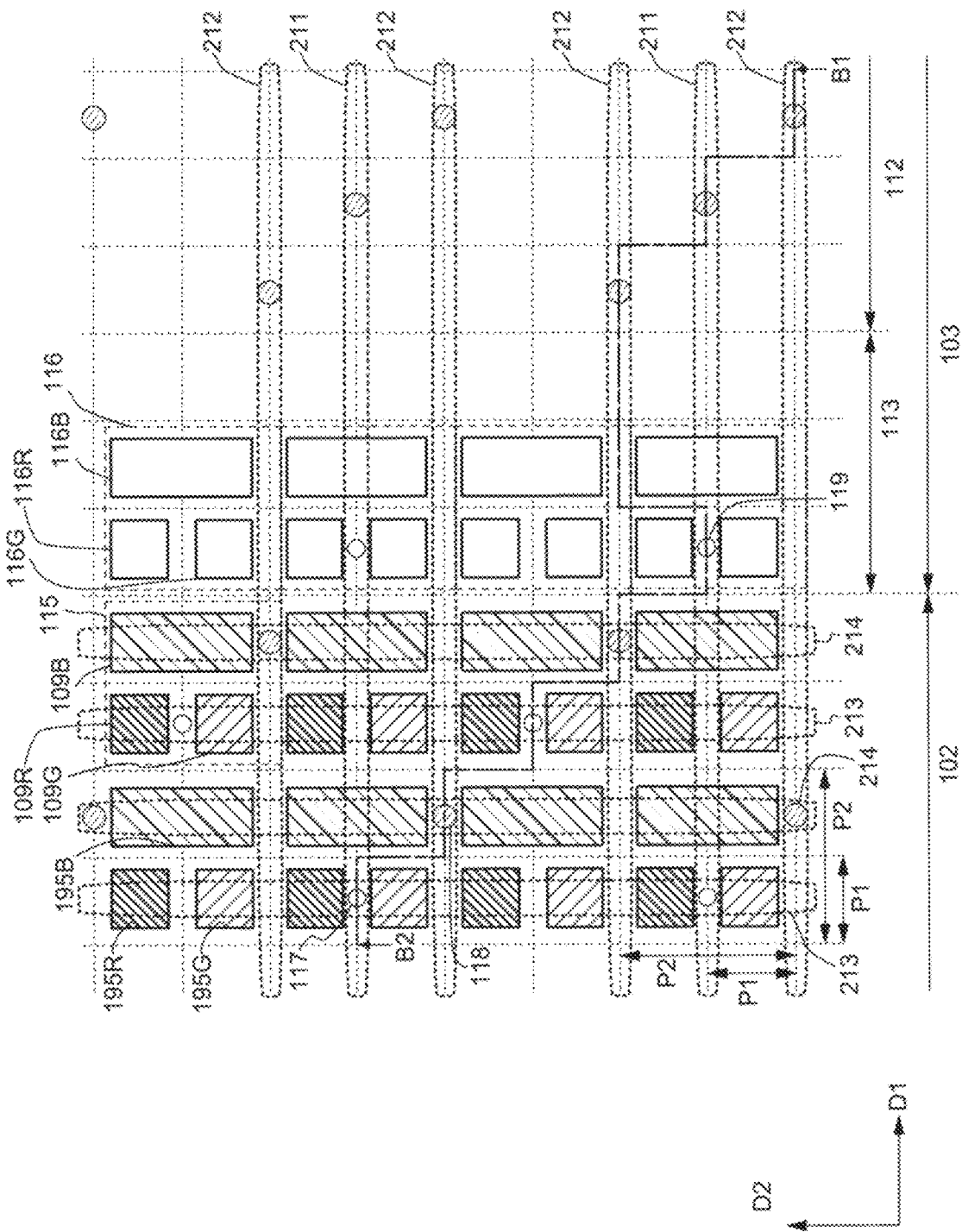
FIG. 2 is a schematic diagram showing a configuration around a border between a display area and a peripheral area of the organic EL display device shown in FIG. 1.

FIG. 1 is a schematic diagram showing a configuration of an organic EL display device 100 according to an embodiment of the present invention, and FIG. 2 is a schematic diagram showing a configuration around a border between a display area 102 and a peripheral area 103 in a first direction D1 of the organic EL display device 100 shown in FIG. 1. In addition, in FIG. 2, a pixel 115, a dummy pixel 116, a first spacer 117, and a second spacer 118 are mainly illustrated, and a scanning signal line 105, a video signal line 110, and the like are omitted.

As shown in FIG. 1, for example, the organic EL display device 100 includes the display area 102 and the peripheral area 103 formed on a first surface 101A of a substrate 101. In a plan view, the organic EL display device 100 is surrounded by a first side 191, a second side 192 opposite the first side, a third side 193, and a fourth side 194 opposite the third side. The peripheral area 103 surrounds the display area 102. In the peripheral area 103, a scanning signal line drive circuit 104 is arranged in the vicinity of the first side 191 and in the vicinity of the second side 192, respectively, and a terminal part is arranged in the vicinity of the third side 193. The terminal part includes a plurality of terminals 107. The plurality of terminals 107 is arranged adjacent to the display area 102 in a second direction D2 (column direction). In addition, although the details will be described later, a plurality of pixels 115 is arranged in the display area 102.

A flexible printed substrate 108 is connected to the terminal part (the plurality of terminals 107). A driver IC 106 is arranged above the flexible printed substrate 108 using a COF (Chip on Film) method. For example, the driver IC 106 includes a video signal line drive circuit. In the present embodiment, the driver IC 106 and the scanning signal line drive circuit 104 may be collectively referred to as a control circuit or a control unit.

A plurality of scanning signal lines 105 is connected to the scanning signal line drive circuit 104. The plurality of scanning signal lines 105 is arranged adjacent to the display area 102 in the first direction D1 (row direction). The scanning signal line drive circuit 104 is arranged adjacent to the display area 102 in the first direction D1. The plurality of scanning signal lines 105 is electrically connected to the plurality of pixels 115. For example, a plurality of video signal lines 110, a high potential power line 111, and a low potential power line 114 are connected to the plurality of terminals 107. The plurality of video signal lines 110 is arranged to extend in the second direction D2 (column direction) of the display device 100. The plurality of video signal lines 110 is electrically connected to the plurality of pixels 115 and also electrically connected to the driver IC 106 via the plurality of terminals 107 and the flexible printed substrate 108. The high potential power line 111 and the low potential power line 114 are electrically connected to the scanning signal line drive circuit 104. The high potential power line 111 and the low potential power line 114 may be electrically connected to the plurality of pixels 115.

The driver IC 106 supplies a signal to the scanning signal line drive circuit 104, the plurality of video signal lines 110, the high potential power line 111, and the low potential power line 114. The plurality of scanning signal lines 105 supplies a scanning signal corresponding to each of the plurality of pixels 115 to the plurality of pixels 115. The plurality of video signal lines 110 supplies a video signal from the driver IC 106 according to an image displayed on the plurality of pixels 115. The high potential power line 111 and the low potential power line 114 supply a voltage to the scanning signal line drive circuit 104 and the plurality of pixels 115.

The first direction D1, the second direction D2, and a third direction D3 intersect each other, in the present embodiment. In addition, the third direction D3 is perpendicular to the first direction D1 and the second direction D2. Further, it is assumed that the third direction D3 is perpendicular to the first direction D1 and the second direction D2 even when the third direction D3 deviates from normal to within an error with respect to the first direction D1 and the second direction D2, in the present embodiment. In this case, it is called, for example, substantially vertical.

The display area 102 and the peripheral area 103 near the first side 191 are shown in FIG. 2. As shown in FIG. 2, the plurality of pixels 115, the first spacer 117, and the second spacer 118 are arranged in the display area 102. In the present embodiment, the display area 102 is referred to as a first area. The peripheral area 103 includes a second area 112 and a third area 113. A plurality of second spacers 118 are arranged in the second area 112. The third area 113 is an area between the display area 102 and the third area 113. Although a plurality of dummy pixels 116 and a third spacer 119 are arranged in the third area 113, the third area 113 includes an area where no spacers of the first spacer 117, the second spacer 118, and the third spacer 119 are arranged.

The pixel 115 is arranged in a matrix in the first direction D1 and the second direction D2. The pixel 115 includes a sub-pixel 109R, a sub-pixel 109G, and a sub-pixel 109B. The sub-pixel 109R and the sub-pixel 109B are arranged side by side in the first direction D1. The sub-pixel 109G and the sub-pixel 109B are arranged side by side in the first direction D1. The sub-pixel 109R and the sub-pixel 109G are arranged side by side in the second direction D2. A plurality of sub-pixels 109B is arranged side by side in the second direction D2. That is, in the display area 102, columns in which the sub-pixel 109R and the sub-pixel 109G are alternately arranged and columns in which only the sub-pixel 109B is arranged are alternately arranged in the first direction D1 (row direction).

A distance between the pixels 115 in the first direction D1 and the second direction D2 and a distance between the sub-pixels 109B are a distance P2. The distance between the pixels 115 in the first direction D1 and the distance between the sub-pixels 109B may be different from a distance between the pixels 115 in the second direction D2. A distance between the sub-pixel 109R and the sub-pixel 109G in the second direction D2 is a distance P1, and a distance between the sub-pixel 109R and the sub-pixel 109G in the first direction D1 is the distance P2. In addition, the distance P1 and the distance P2 are referred to as a pitch of a pixel or a pixel pitch, in the present embodiment.

A pixel opening 195R is an area where a light-emitting layer 145R (FIG. 3) is arranged, and corresponds to the sub-pixel 109R. A pixel opening 195G is an area where a light-emitting layer 145G (FIG. 3) is arranged, and corresponds to the sub-pixel 109G. A pixel opening 195B is an area where a light-emitting layer 145B (FIG. 3) is arranged, and corresponds to the sub-pixel 109B. Although the details will be described later, the pixel 115 includes the light-emitting layer 145R (FIG. 3), the light-emitting layer 145G (FIG. 3), and the light-emitting layer 145B (FIG. 3), and is a pixel for displaying an image on the organic EL display device 100.

The light-light-emitting layer 145R, light-emitting layer 145G, and the light-emitting layer 145B are light-emitting layers that emit colors different from each other. For example, the sub-pixel 109R includes the light-emitting layer 145R that emits red light, and includes a red light-emitting element. The sub-pixel 109G includes the light-emitting layer 145G that emits green light, and includes a green light-emitting element. The sub-pixel 109B includes the light-emitting layer 145B that emits blue light, and includes a blue light-emitting element. A component included in the red light-emitting element is indicated by R (red), a component included in the green light-emitting element is indicated by G (green), and a component included in the blue light-emitting element is indicated by B (blue), In the present embodiment. For example, an emission peak-wavelength of the blue light-emitting element is 460 nm or more and 500 nm or less. An emission peak-wavelength of the red light-emitting element is 610 nm or more and 780 nm or less. An emission peak-wavelength of the green light-emitting element is 500 nm or more and 570 nm or less.

In addition, each of the sub-pixel 109R, the sub-pixel 109G, and the sub-pixel 109B may be referred to as a pixel, and the sub-pixel 109R may be referred to as a first pixel, the sub-pixel 109G may be referred to as a second pixel, and the sub-pixel 109B may be referred to as a third pixel, in the present embodiment. In addition, each of the light-emitting layer 145R, the light-emitting layer 145G, and the light-emitting layer 145B may be referred to as a first light-emitting layer, a second light-emitting layer, and a third light-emitting layer.

The dummy pixel 116 includes a dummy sub-pixel 116R, a dummy sub-pixel 116G, and a dummy sub-pixel 116B. The dummy pixel 116 in the present embodiment is a pixel that does not include the light-emitting layer 145R (FIG. 3), the light-emitting layer 145G (FIG. 3), and the light-emitting layer 145B (FIG. 3) as compared with the pixel 115 and does not display an image of the organic EL display device 100. The other configuration of the dummy pixel 116 is the same as that of the pixel 115, and a detailed description thereof will be omitted.

In this case, mainly, the arrangement of the first spacer 117 and the second spacer 118 and the arrangement of the sub-pixel 109R, the sub-pixel 109G, and the sub-pixel 109B (the pixel opening 195R, the pixel opening 195G, and pixel opening 195B) in the display area 102 will be described. The first spacer 117 is arranged between the sub-pixel 109R and the sub-pixel 109G (between the pixel opening 195R and the pixel opening 195G). In addition, the pixel 115 including the first spacer 117 and the pixel 115 not including the first spacer 117 are alternately arranged in a matrix in the first direction D1 and the second direction D2. The second spacer 118 is arranged between the two sub-pixels 109B (between the two pixel openings 195B). In addition, the pixel 115 including the second spacer 118 and the pixel 115 not including the second spacer 118 are arranged in a matrix in the first direction D1 and the second direction D2.

Next, the arrangement of the second spacer 118 in the second area will be described. One second spacer 118 is arranged for each of the four sub-pixels (every four times the distance P1) in the second direction D2. In addition, the second spacer 118 arranged in the second direction D2 adjacent to each other in a direction opposite to the second direction D2 shifted by one sub-pixel (the distance P1), in the first direction D1 (row direction). In addition, although a part of the second area 112 is shown as an example in FIG. 2, the plurality of second spacers 118 is arranged at least in the second area 112 where the organic EL display device 100 and a support frame 208 (FIG. 6) overlap.

Further, the arrangement of the third spacer 119, the dummy sub-pixel 116R, the dummy sub-pixel 116G, and the dummy pixel 116 in the third area 113 will be described. The third spacer 119 is arranged between the dummy sub-pixel 116R and the dummy sub-pixel 116G. In addition, the dummy pixel 116 including the third spacer 119 and the dummy pixel 116 not including the third spacer 119 are alternately arranged in the second direction D2. Although not shown, the dummy pixel 116 is arranged around the display area 102 in one circumference, and the dummy pixel 116 including the third spacer 119 and the dummy pixel 116 not including the third spacer 119 are alternately arranged in an area where the dummy pixel 16 is arranged in the first direction D1, in the example of the present embodiment. In addition, the dummy pixel 116 may be arranged in two columns (two rings around the display area 102) or more.

In summary, a first group 211 including the first spacer 117 and the second spacer 118 of the second area 112, and a second group 212 including the second spacer 118 of the first area 102 and the second spacer 118 of the second area 112 are alternately arranged parallel or substantially parallel to the first direction D1, in the arrangement of the first spacer 117 and the second spacer 118 in a plan view. In addition, a third group 213 including only the first spacer 117, and a fourth group 214 including only the second spacer 118 are alternately arranged parallel or substantially parallel to the second direction D2, in the arrangement of the first spacer 117 and the second spacer 118 in a plan view. The second group 212 includes only the second spacer 118, in the arrangement of the first spacer 117 and the second spacer 118 in a plan view.

In addition, although the details will be described later with reference to FIG. 4, the plurality of first spacers 117 and the plurality of second spacers 118 arranged in the display area 102 (the first area), and the plurality of second spacers 118 arranged in the second area 112 are arranged on the same layer.

In addition, bottom surfaces of the first spacer 117, the second spacer 118, and the third spacer 119 are shown in FIG. 2. In addition, the bottom surface size (bottom area) of the second spacer 118 is larger than the bottom surface size (bottom area) of the first spacer 117 and the bottom surface size (bottom area) of the third spacer 119 in the example shown in FIG. 2. Although the shape of the third spacer 119 is similar to the shape of the first spacer 117 in the example shown in FIG. 2, the shape of the third spacer 119 may be different from the shape of the first spacer 117. In addition, the shape of the first spacer 117, the shape of the second spacer 118, and the shape of the third spacer 119 may be the same shape as each other.

Although an example in which the bottom surface shapes of the first spacer 117, the second spacer 118, and the third spacer 119 are circular is shown, the shapes of bottom surface of the first spacer 117, the second spacer 118, and the third spacer 119 may be polygons such as triangles, squares, and hexagons, and may be elliptical shapes in the present embodiment. The shapes of the bottom surface of the first spacer 117, the second spacer 118, and the third spacer 119 may be any shape capable of supporting a vapor deposition mask unit 200.

Although the details will be described later, when the light-emitting layer 145R, the light-emitting layer 145G, and the light-emitting layer 145B are formed on the organic EL display device 100 in the manufacturing method of the organic EL display device 100, a mother substrate 180 including the organic EL display device 100 is fixed to the vapor deposition mask unit 200. In this case, the second area 112 overlaps a part of the vapor deposition mask unit 200 (a connection portion 206 and the support frame 208 shown in FIG. 6), and the third area 113 overlaps the connection portion 206. Since the third area 113 of the organic EL display device 100 includes an area that does not include the first spacer 117 and the second spacer 118, the vapor deposition mask unit 200 does not abut the third area 113. As a result, in the manufacturing method of the organic EL display device 100, a vapor deposition film (for example, the light-emitting layer 145B) deposited on the vapor deposition mask unit 200 (a vapor deposition mask 202 (FIG. 6)) is peeled off and the peeled vapor deposition film is not deposited on the organic EL display device 100. Therefore, in the organic EL display device 100, a display defect caused by the peeled vapor deposition film is suppressed, and a decrease in the manufacturing yield of the organic EL display device 100 is suppressed.

<1-2. Cross-Section of Organic EL Display Device 100>

Figure 3:
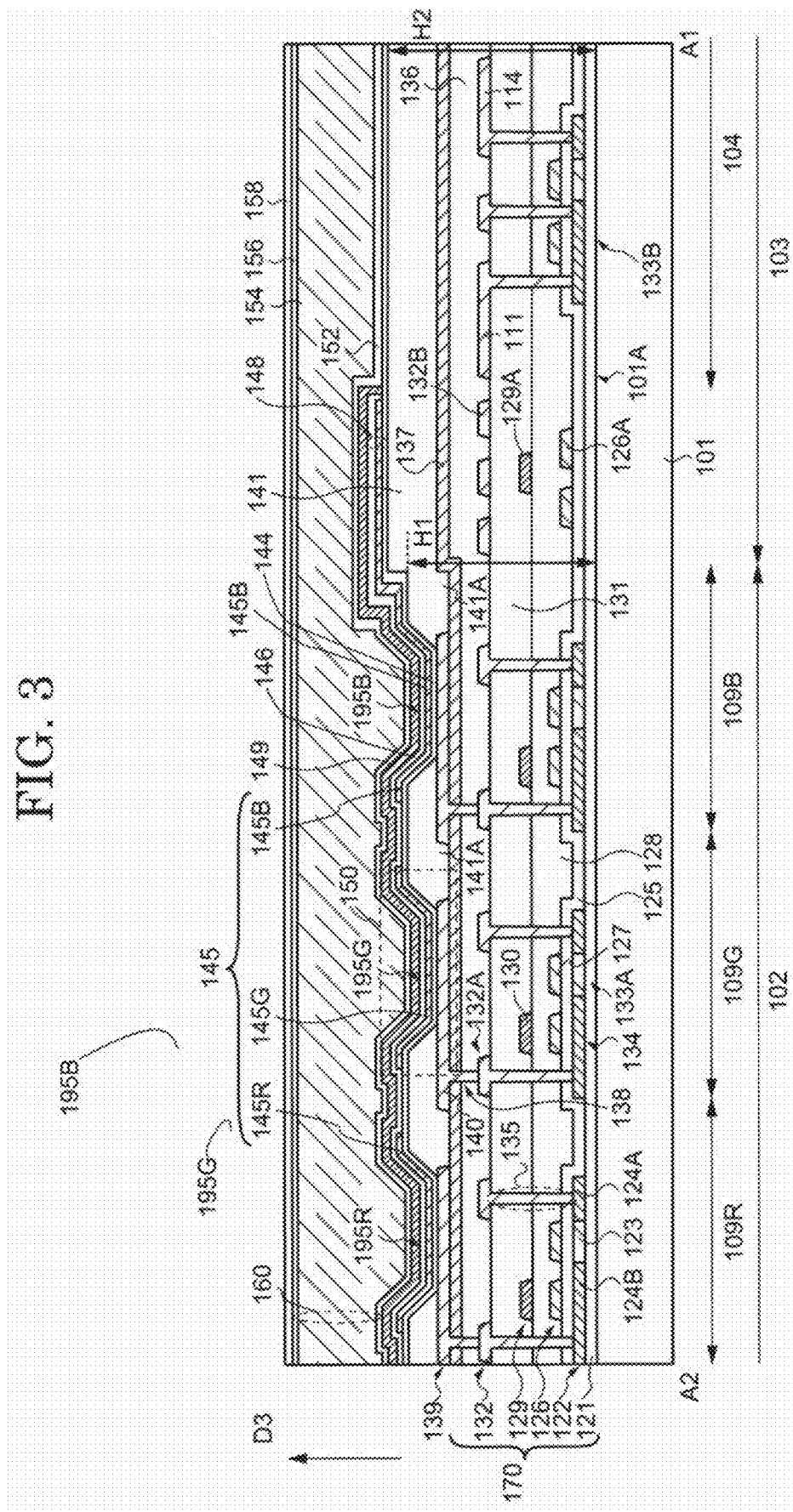
FIG. 3 is a cross-sectional view along a line A1-A2 of the organic EL display device shown in FIG. 1.
Figure 4:
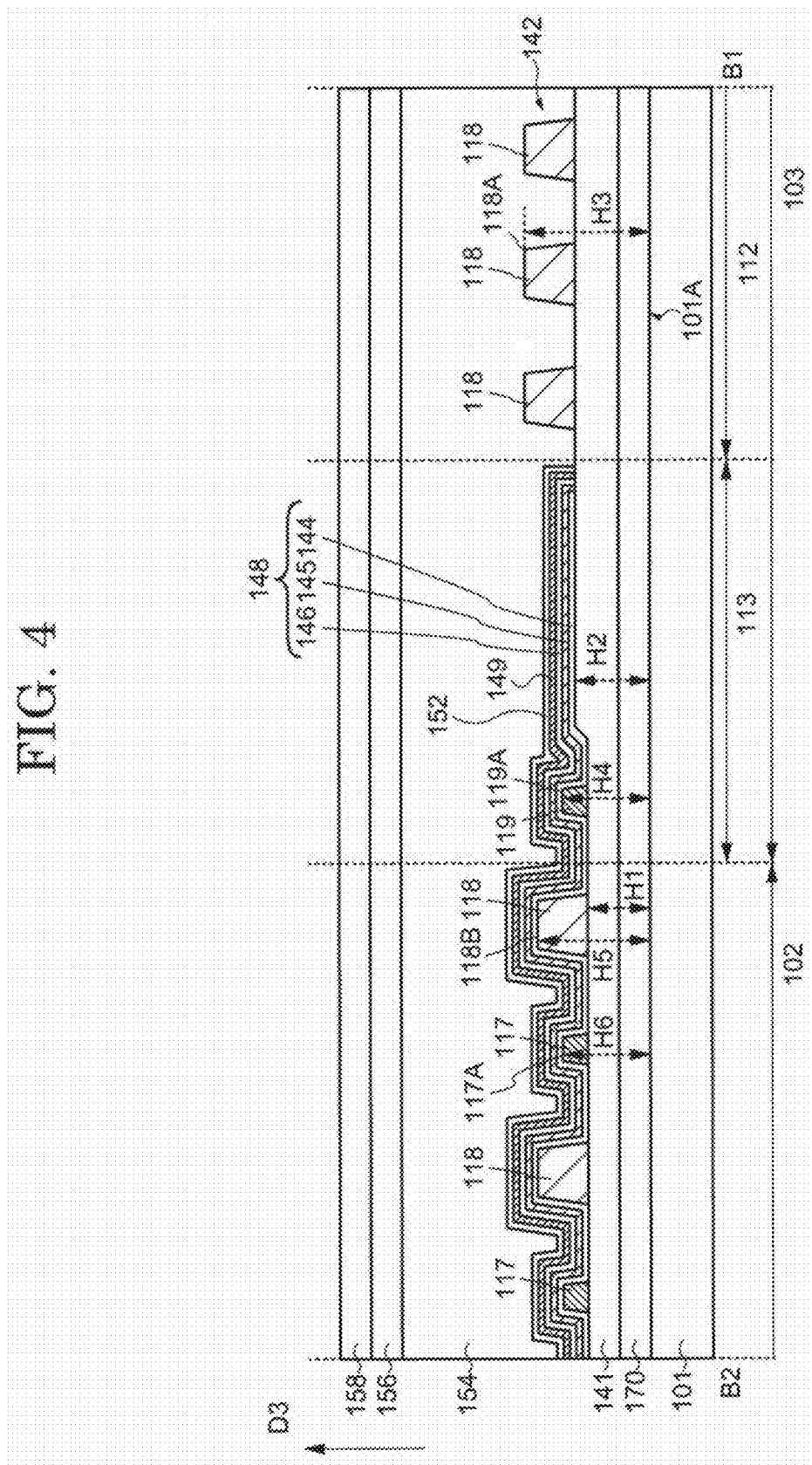
FIG. 4 is a cross-sectional view along a line B1-B2 of the organic EL display device shown in FIG. 3.

FIG. 3 is a cross-sectional view along a line A1-A2 of the organic EL display device 100 shown in FIG. 1, and FIG. 4 is a cross-sectional view along a line B1-B2 of the organic EL display device 100 shown in FIG. 2. The same or similar configurations as those in FIG. 1 and FIG. 2 will not be described here.

As shown in FIG. 3, a semiconductor layer 122 is arranged on the first surface 101A of the substrate 101 via a base film 121. The semiconductor layer 122 includes a channel area 123, a source area 124A, and a drain area 124B. In addition, the electrode source function and the electrode drain function of the source area 124A and the drain area 124B may be interchanged according to voltages supplied to each other.

A gate insulating layer 125, a conductive layer 126, an insulating layer 128, a conductive layer 129, an insulating layer 131, and a conductive layer 132 are arranged in this order on the upper layer of the semiconductor layer 122. The conductive layer 126 includes a gate electrode 127 and the scanning signal line 105 (FIG. 1). The conductive layer 129 includes a capacitive line 130. The conductive layer 132 includes an electrode 132A, the high potential power line 111, the low potential power line 114, and the video signal line 110 (FIG. 1).

The organic EL display device 100 includes a plurality of transistors. For example, each of the plurality of transistors is formed using the semiconductor layer 122 (the channel area 123, the source area 124A, and the drain area 124B), the gate insulating layer 125, and the gate electrode 127. The channel area 123 is an area where the semiconductor layer 122 and the gate electrode 127 overlap each other, and is an area arranged between the source area 124A and the drain area 124B. For example, the plurality of transistors includes a driving transistor 133A and a transistor 133B. The driving transistor 133A is included in the sub-pixel 109R, the sub-pixel 109G, and the sub-pixel 109B, and is a transistor for driving the sub-pixel 109R, the sub-pixel 109G, and the sub-pixel 109B. The transistor 133B is included in the scanning signal line drive circuit 104 and is a transistor for driving the scanning signal line drive circuit 104.

In addition, the organic EL display device 100 may include a capacitive element. For example, a capacitive element 134 is formed using the gate insulating layer 125 as a dielectric, the capacitive line 130, and the semiconductor layer 122. In addition, the capacitive element 134 may be formed using the insulating layer 128 as a dielectric, the capacitive line 130, and the conductive layer 126, and the insulating layer 131 as a dielectric, the capacitive line 130, and the conductive layer 132. Further, the capacitive element 134 may be formed using the capacitive line 130 and a layer above the capacitive line 130.

An opening 135 reaching the semiconductor layer 122 is arranged in the gate insulating layer 125, the insulating layer 128, and the insulating layer 131. The conductive layer 132 is electrically connected to the semiconductor layer 122, the source area 124A, and the drain area 124B by using the opening 135. In addition, an opening (not shown) reaching the gate electrode 127 is arranged in the insulating layer 128 and the insulating layer 131, and an opening (not shown) that reaches the capacitive line 130 is arranged in the insulating layer 128 and the insulating layer 131.

An insulating layer 136 is arranged to cover the conductive layer 132. An insulating layer 137 may be formed on the upper layer of the insulating layer 136. In addition, a conductive layer (not shown) may be formed between the insulating layer 137 and the insulating layer 136, and the capacitive element may be formed using a pixel electrode 140 (a conductive layer 139) and the conductive layer using the insulating layer as a dielectric. In the organic EL display device 100, an example in which the insulating layer 137 is formed is shown.

A plurality of openings 138 is arranged in the insulating layer 136 and the insulating layer 137. The conductive layer 139 is arranged on the upper layer of the insulating layer 137 and in the opening 138. The conductive layer 139 includes the pixel electrode 140. The opening 138 electrically connects the pixel electrode 140 and the conductive layer 132 (the electrode 132A). Although not shown, the opening 138 electrically connects the pixel electrode 140 and a wiring 132B. Further, the opening exposes a portion of the terminal 107. A portion of the exposed terminal 107 is connected to the flexible printed substrate 108 using a conductive film, such as an anisotropic conductive film (not shown).

An insulating layer 141 is arranged to cover an end portion of the pixel electrode 140. The insulating layer 141 includes a partition wall 141A. In the organic EL display device 100, disconnection of a functional layer 148 and a common electrode 149 arranged on the upper layer of the partition wall 141A can be prevented by covering the end portion of the pixel electrode 140 with the partition wall 141A.

In the display area 102, a height between the first surface 101A and an upper surface of the partition wall 141A is a height H1, and in the peripheral area 103, the height between the first surface 101A and the upper surface of the partition wall 141A is a height H2. A density of unevenness (surface area of unevenness) such as wirings and power lines in the peripheral area 103 is higher than a density of unevenness (surface area of unevenness) of the wirings of the display area 102. Generally, the insulating layer 141 is mostly in contact with the unevenness on the lower layer of the insulating layer 141, and the surface of the insulating layer 141 is mostly uniformly flat. On the other hand, when there is a difference in the surface area of the unevenness such as the wirings and power lines on the lower layer of the insulating layer 141, the thickness of a conductive layer in an area with a large uneven surface area is considered to be thinner than the thickness of the conductive layer stacked before forming the wirings and power lines, but thicker than the thickness of the conductive layer in an area with a small uneven surface area. As a result, a height between the first surface 101A and the surface of the insulating layer 141 is higher in an area having a high surface area of unevenness such as the wirings and power lines than in an area having a low surface area of unevenness such as the wirings and power lines. Therefore, the height H2 is higher than the height H1.

An insulating layer 142 will be described with reference to FIG. 4. The insulating layer 142 is arranged on the upper layer of the insulating layer 141, in the organic EL display device 100. The insulating layer 142 includes the first spacer 117, the second spacer 118, and the third spacer 119. In addition, in the present embodiment, as shown in FIG. 4, the base film 121, the semiconductor layer 122, the gate insulating layer 125, the conductive layer 126, the insulating layer 128, the conductive layer 129, the insulating layer 131, the conductive layer 132, the insulating layer 136, and the insulating layer 137 are collectively referred to as an array portion 170.

The first spacer 117 and the second spacer 118 are alternately arranged on the upper layer of the insulating layer 141 (the partition wall 141A), in the display area 102. The third spacer 119 is arranged above the insulating layer 141 (the partition wall 141A) proximate to the display area 102 (the first area), in the third area 113. In addition, the third area 113 includes an area where the first spacer 117, the second spacer 118, and the third spacer 119 are not arranged. The plurality of second spacers 118 is arranged above the insulating layer 141 (the partition wall 141A), in the second area 112. A length (width) of the area where the first spacer 117, the second spacer 118, and the third spacer 119 are not arranged is, for example, the sum of the lengths of the two sub-pixels (two times the distance P1, the distance P2) parallel to the first direction D1, in the third area 113 in the present embodiment.

A height between the first surface 101A and an upper surface 117A of the first spacer 117 is a height H6, and a height between the first surface 101A and an upper surface 118B of the second spacer 118 is a height H5, in the display area 102. A height between the first surface A and an upper surface 119A of the third spacer 119 is a height H4, in the third area 113. A height between the first surface 101A and an upper surface 118A of the second spacer 118 is a height H3, in the second area 112. The height H6 is the same as the height H4. The height H6 is higher than the height H1 and the height H2. The height H5 is higher than the height H6, and the height H3 is higher than the height H5. That is, the height H3 between the first surface 101A and the upper surface 118A of the second spacer 118 is the highest. As a result, in the organic EL display device 100, in the manufacturing method of the organic EL display device 100, the upper surface 118A of the second spacer 118 arranged on the second area 112 abuts a part of the vapor deposition mask unit 200 (the connection portion 206 and the support frame 208 shown in FIG. 6), and the vapor deposition mask unit 200 does not abut the third area 113.

In addition, the first spacer 117 may be referred to as a spacer having a first height, and the second spacer 118 of the display area 102 (the first area) may be referred to as a spacer having a second height, in the present embodiment.

Next, the upper layer of the insulating layer 142 will be described with reference to FIG. 3 or FIG. 4. The functional layer 148 is arranged to cover the pixel electrode 140, the partition wall 141A, the first spacer 117, and the second spacer 118 included in the display area 102, and the third spacer 119 and the insulating layer 141 (the partition wall 141A) included in the third area. The common electrode 149 is arranged on the upper layer of the functional layer 148 to cover the functional layer 148. An area where the pixel electrode 140 and the functional layer 148 are in contact with each other is a light-emitting area in each sub-pixel 109R, each sub-pixel 109G, and each sub-pixel 109B.

The configuration of the functional layer 148 can be selected as appropriate. For example, the functional layer 148 may be configured by combining a carrier injection layer, a carrier transport layer, a light-emitting layer, a carrier blocking layer, an exciton blocking layer, and the like. An example in which the functional layer 148 includes a first layer 144, a second layer 145, and a third layer 146 is shown in FIG. 3 and FIG. 4. For example, the first layer 144 is a carrier (hole) injection and transport layer, the second layer 145 is a light-emitting layer, and the third layer 146 is a carrier (electron) injection and transport layer. The second layer 145 may be configured to include the sub-pixel 109R, the sub-pixel 109G, and the sub-pixel 109B. The light-emitting layer 145R is formed in the sub-pixel 109R, the light-emitting layer 145G is formed in the sub-pixel 109G, and the light-emitting layer 145B is formed in the sub-pixel 109B, in the organic EL display device 100.

A light-emitting element 150 is formed on the upper layer of the insulating layer 137, in the organic EL display device 100. The light-emitting element 150 is composed of the pixel electrode 140, the functional layer 148, and the common electrode 149. For example, when the driving transistor 133A of the sub-pixel 109G is driven, a desired current is supplied to the light-emitting element 150, and the light-emitting element 150 emits light.

A sealing film 160 is arranged on the upper layer of the light-emitting element 150. The sealing film 160 may be a first inorganic insulating layer 152, an organic insulating layer 154, and a second inorganic insulating layer 156. The first inorganic insulating layer 152 and the second inorganic insulating layer 156 are formed to cover at least the display area 102. A cover film 158 is arranged on the upper layer of the second inorganic insulating layer 156.

The first layer 144, the second layer 145 (the light-emitting layer), the third layer 146, the common electrode 149, and the first inorganic insulating layer 152 included in the functional layer 148 are not arranged in the second area 112. The organic insulating layer 154, the second inorganic insulating layer 156, and the cover film 158 are arranged on the upper layer of the plurality of second spacers 118 included in the second area 112.

An example in which each sub-pixel 109R, each sub-pixel 109G, and each sub-pixel 109B includes one driving transistor 133A, respectively is shown in the organic EL display device 100. Each sub-pixel 109R, each sub-pixel 109G, and each sub-pixel 109B may include semiconductor elements such as the plurality of transistors and capacitive elements.

The terminal 107 (FIG. 1), the pixel 115, the scanning signal line drive circuit 104, and the like are electrically connected using, for example, a wiring 126A, a wiring 129A, or the wiring 132B formed on the conductive layer 126, the conductive layer 129, or the conductive layer 132, in the organic EL display device 100. That is, each element such as the transistor and the capacitive element is electrically connected using the wirings formed on the conductive layer 126, the conductive layer 129, or the conductive layer 132.

For example, an inorganic insulating layer can be used as the gate insulating layer 125, the insulating layer 128, the insulating layer 137, the first inorganic insulating layer 152, and the second inorganic insulating layer 156.

An organic compound material selected from acrylics, polyimides, and the like with excellent film surface flatness can be used as the insulating layer 131, the insulating layer 136, the insulating layer 141, the insulating layer 142, and the organic insulating layer 154. The insulating layer 131, the insulating layer 136, the insulating layer 141, the insulating layer 142, and the organic insulating layer 154 cover the unevenness caused by the transistors or other semiconductor elements, and the surface of the insulating layer 131 is a flat surface.

The sealing film 160 suppresses impurities (such as water and oxygen) from entering the light-emitting element 150 and the transistor from the outside. Although not shown, the first inorganic insulating layer 152, the second inorganic insulating layer 156, and the first layer 144 are in direct contact at the periphery of the organic EL display device 100. As a result, in the organic EL display device 100, it is possible to suppress impurities from entering from the outside.

<1-3. Method of Forming Functional Layer 148 of Organic EL Display Device 100>

Figure 5:
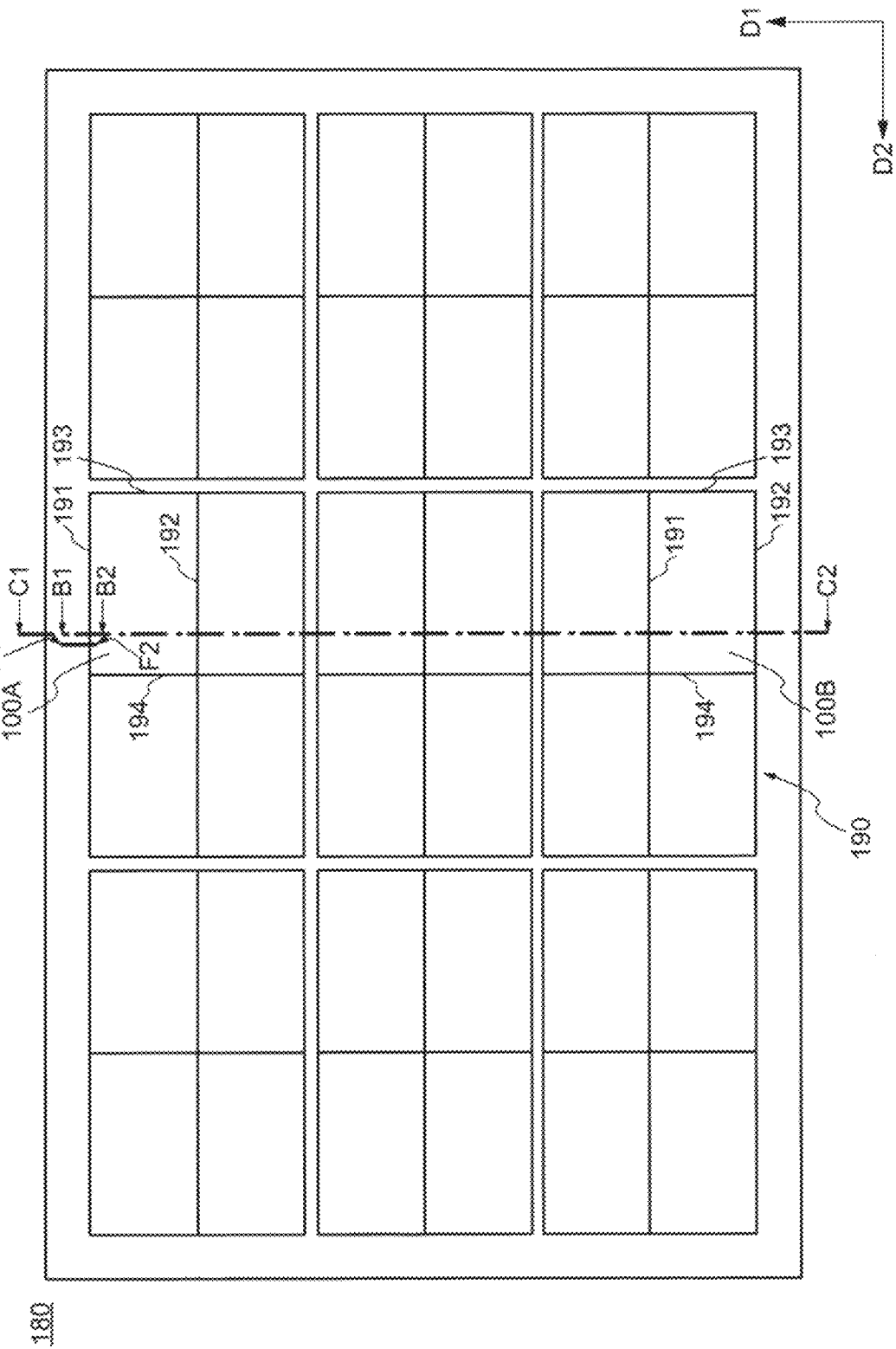
FIG. 5 is a schematic diagram showing a configuration of a mother substrate according to the first embodiment of the present invention.
Figure 6:
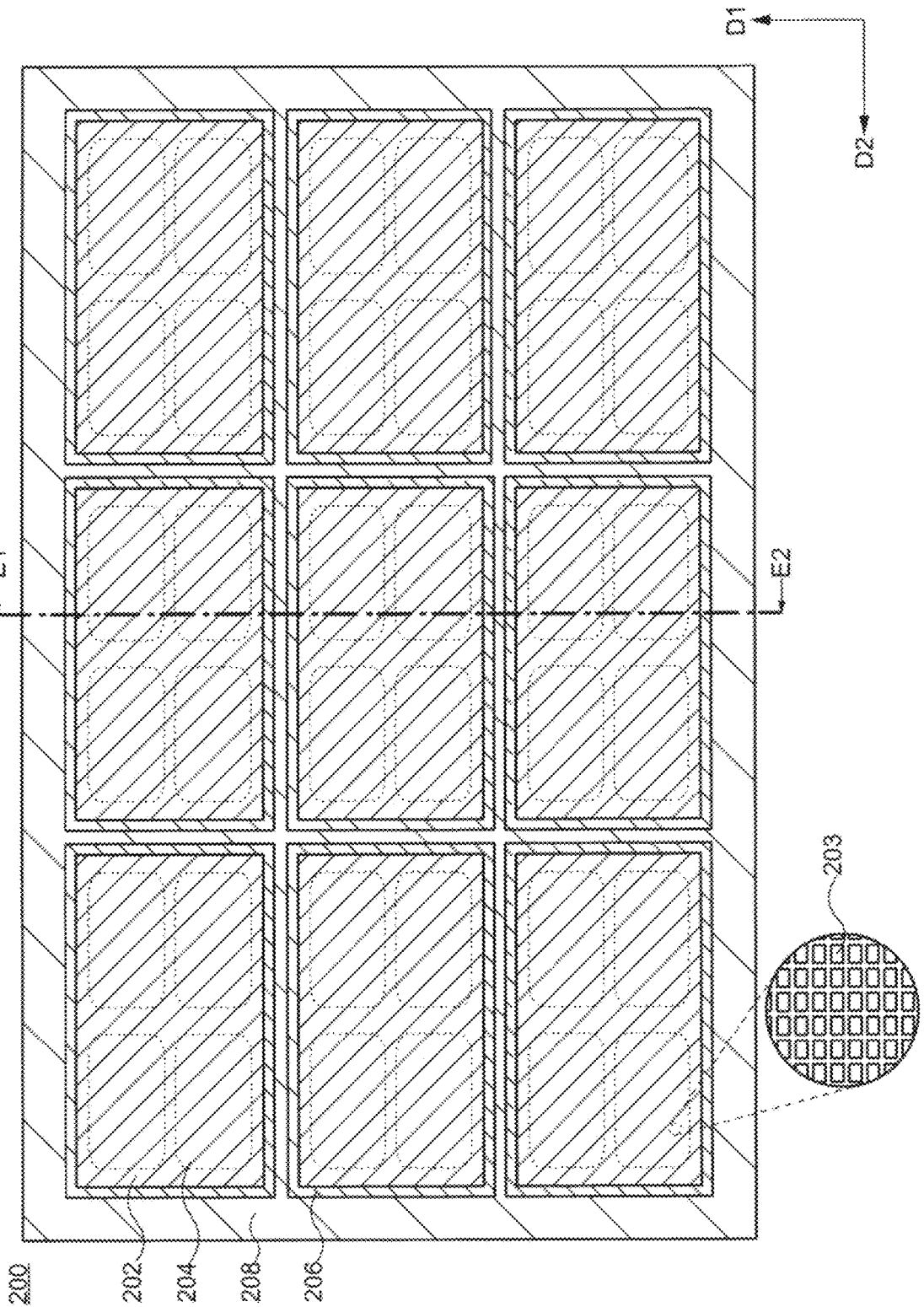
FIG. 6 is a schematic view showing a vapor deposition mask unit according to the first embodiment of the present invention.
Figure 8:
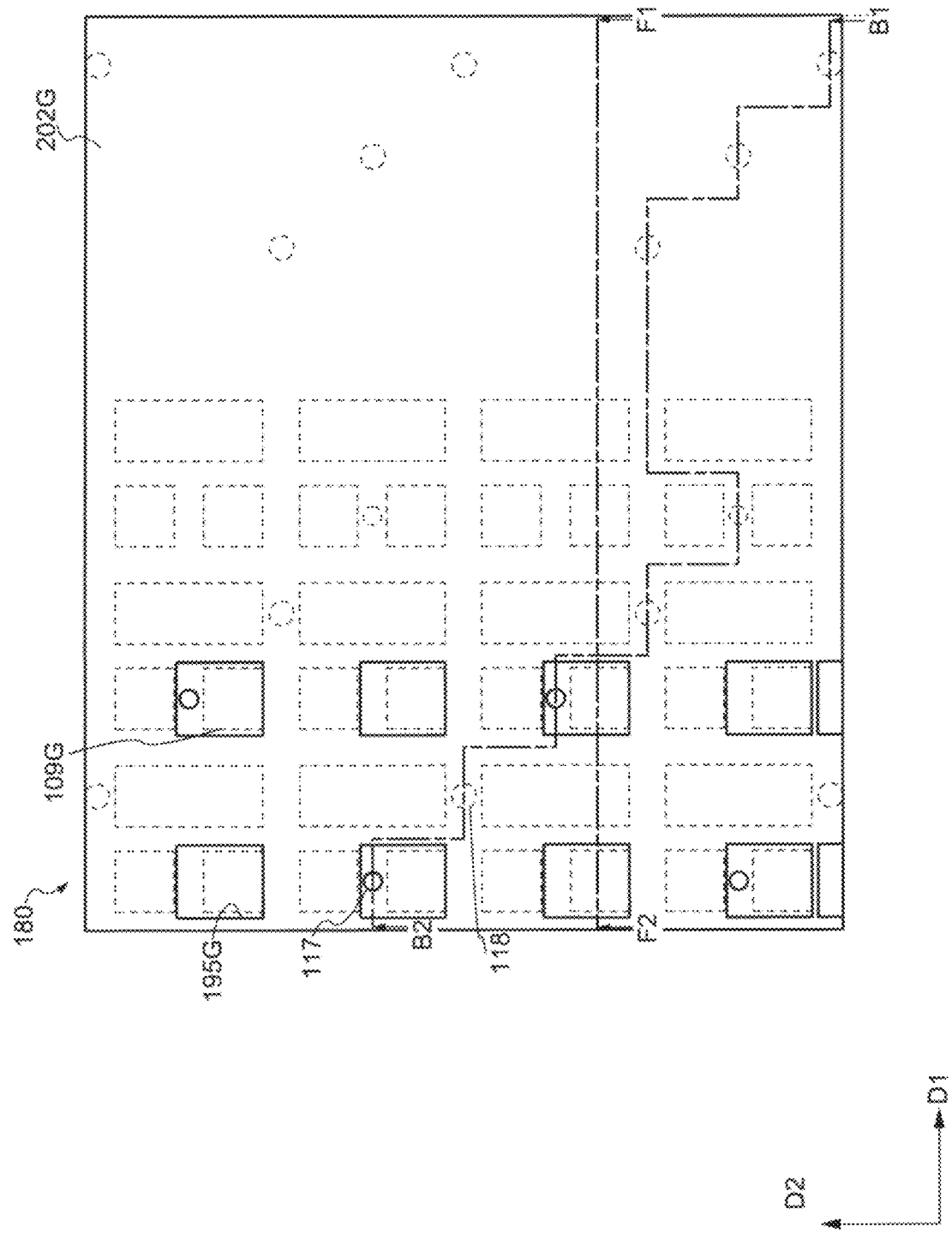
FIG. 8 is a schematic diagram showing an example of a deposition mask of an organic EL display device according to the first embodiment of the present invention.
Figure 9:
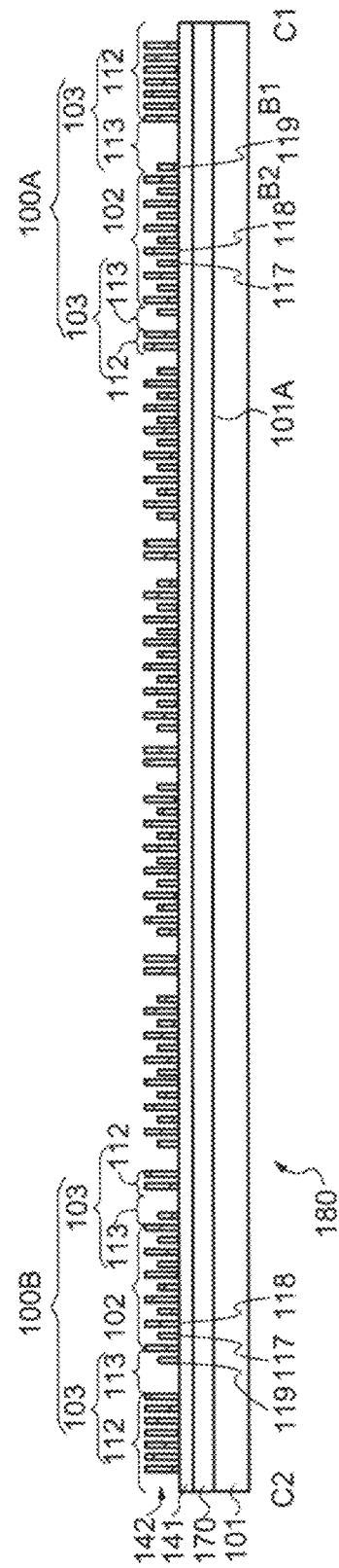
FIG. 9 is a cross-sectional view along a line C1-C2 of the mother substrate shown in FIG. 5.
Figure 10:
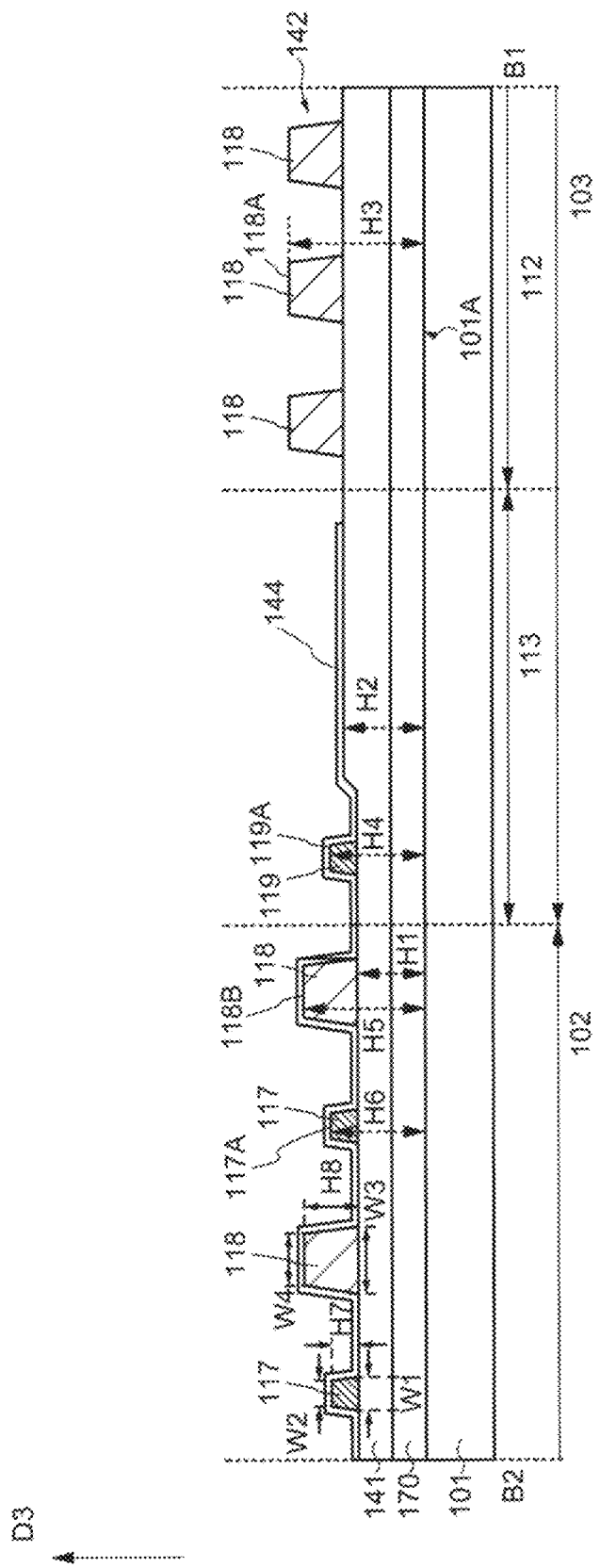
FIG. 10 is a cross-sectional view along a line B1-B2 shown in FIG.
Figure 11:
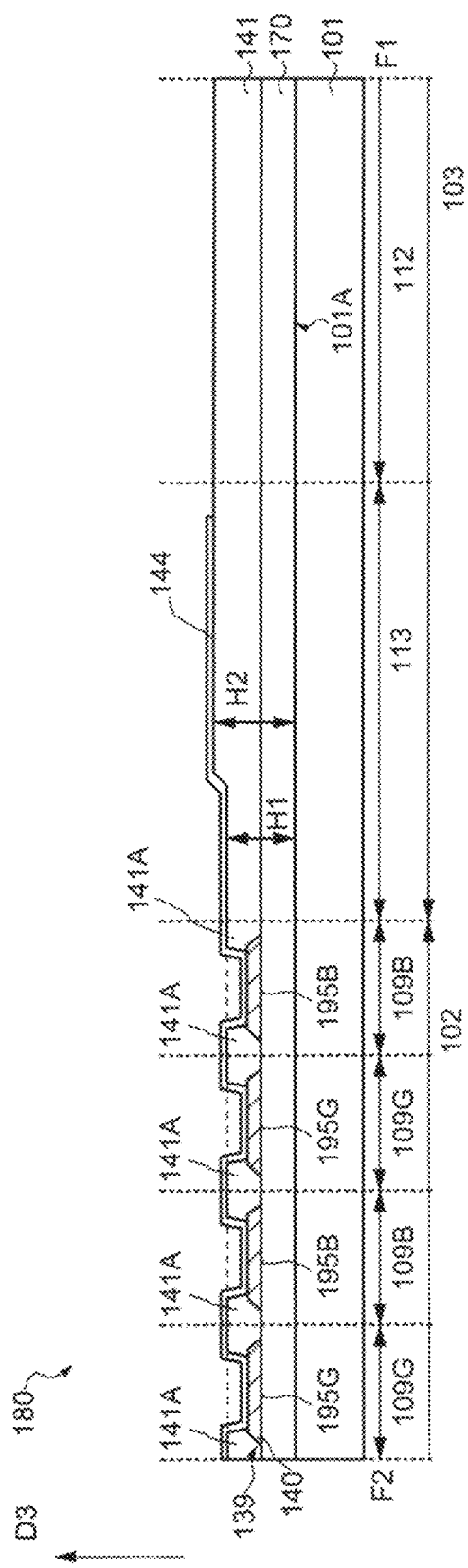
FIG. 11 is a cross-sectional view along a line F1-F2 shown in FIG. 7.
Figure 12:
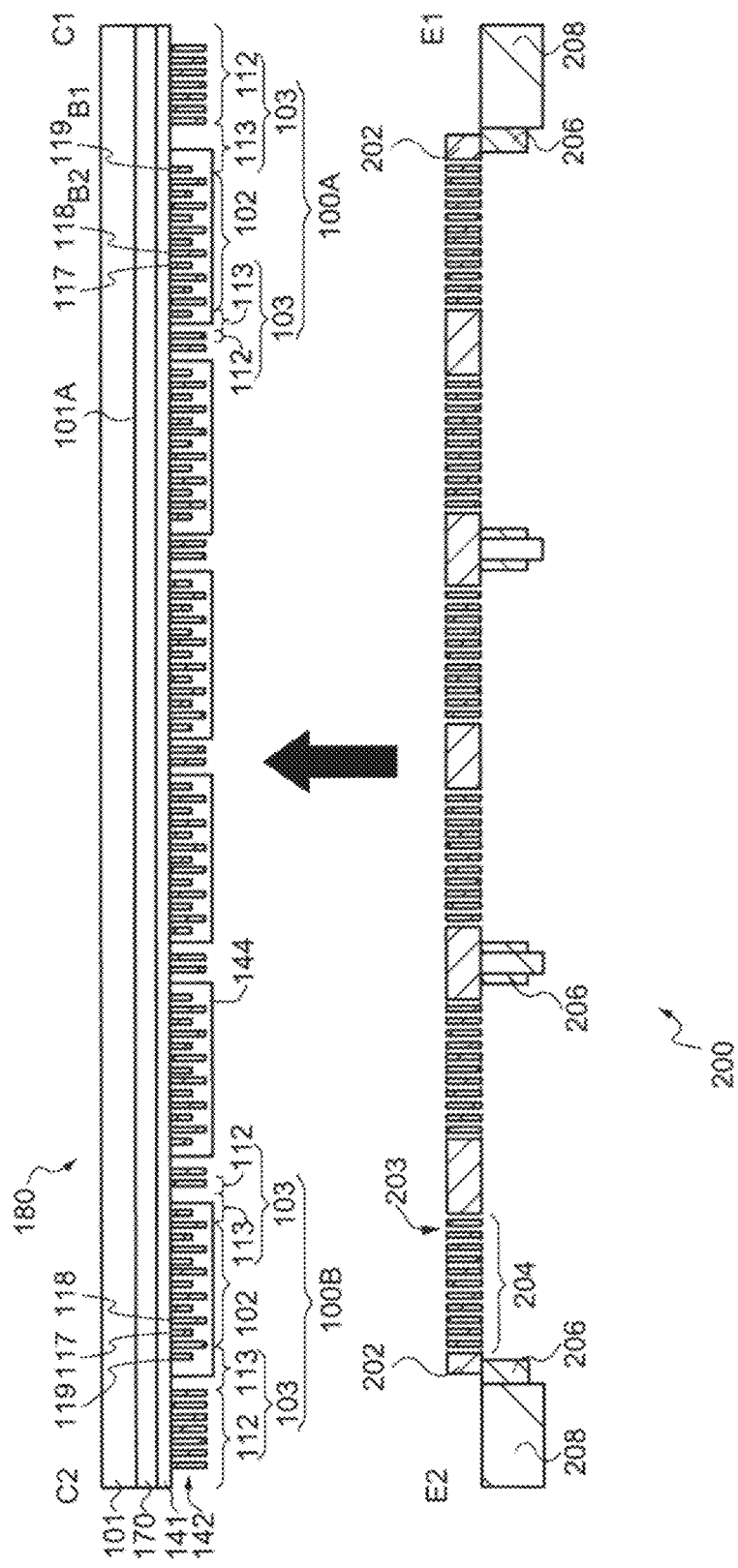
FIG. 12 is a schematic diagram showing an example of a manufacturing method of an organic EL display device according to the first embodiment of the present invention.
Figure 13:
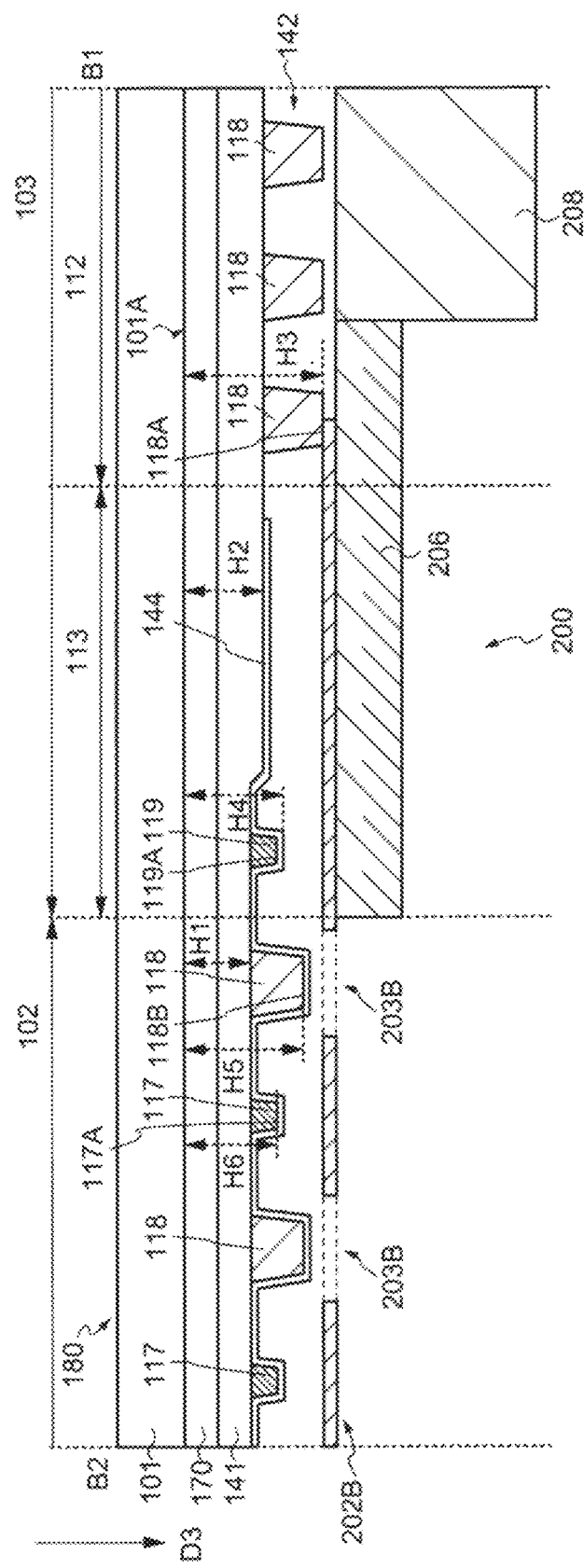
FIG. 13 is a schematic diagram showing an example of a manufacturing method of an organic EL display device according to the first embodiment of the present invention.
Figure 18:
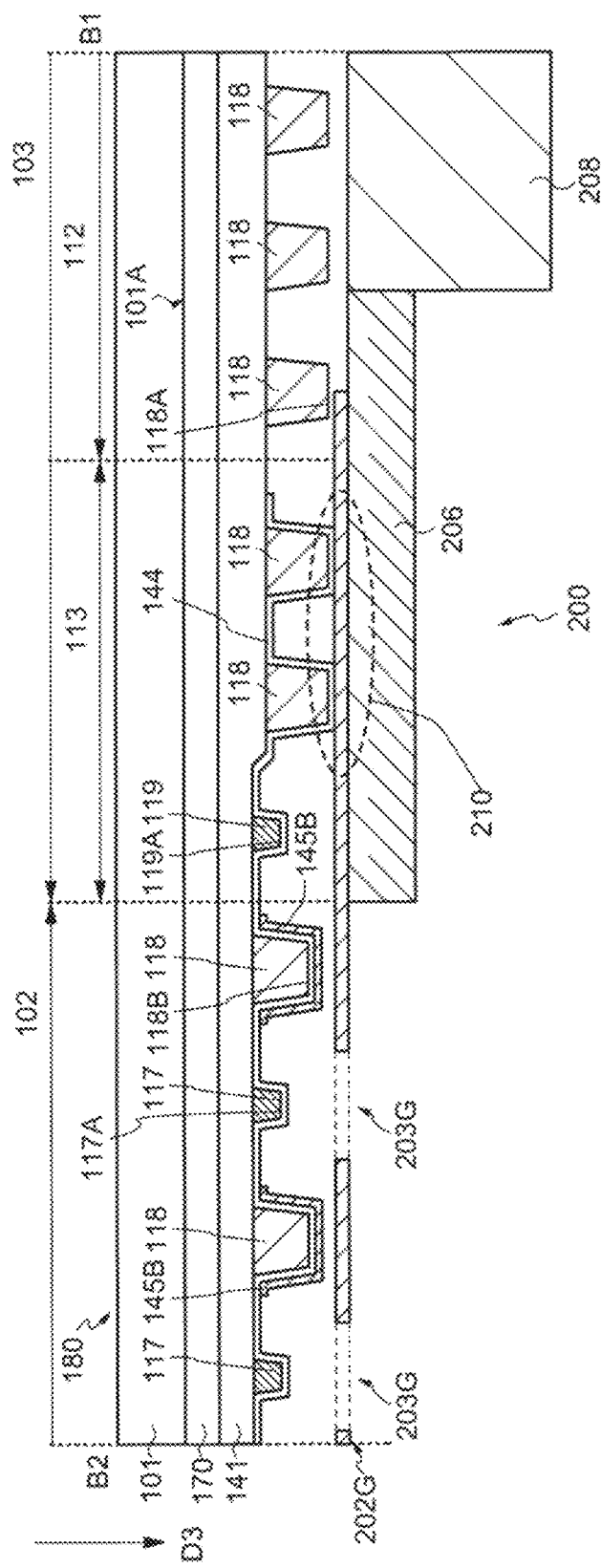
FIG. 18 is a schematic diagram showing an example of a manufacturing method of a comparative example.

A method of forming the functional layer 148 of the organic EL display device 100 will be described with reference to FIG. 5 to FIG. 16. FIG. 5 is a schematic diagram showing a configuration of the mother substrate 180 according to the first embodiment of the present invention, and FIG. 6 is a schematic diagram showing the vapor deposition mask unit 200 according to the first embodiment of the present invention. FIG. and FIG. 8 are schematic diagrams showing an example of a vapor deposition mask 202 of the organic EL display device 100 according to the first embodiment of the present invention. FIG. 9 is a cross-sectional view along a line C1-C2 of the mother substrate 180 shown in FIG. 5, and FIG. 10 is a cross-sectional view along a line B1-B2 shown in FIG. 2 and FIG. 5 in the manufacturing process of the organic EL display device 100. FIG. 12 is a schematic diagram showing an example of a manufacturing method of an organic EL display device 100A, and is a schematic diagram showing a cross-sectional view along a line C1-C2 of the mother substrate in the manufacturing process of the organic EL display device 100 and a cross-sectional view along a line E1-E2 of the vapor deposition mask unit 200. FIG. 13 to FIG. 16 are schematic diagrams showing an example of a manufacturing method of the organic EL display device 100A. FIG. 18 is a schematic diagram showing an example of a manufacturing method of a comparative example. Descriptions of the same or similar configurations as those in FIG. 1 to FIG. 4 will be omitted.

<1-3-1. Configuration of Mother Substrate 180>

As shown in FIG. 5, for example, with four organic EL display devices 100 as one unit 190, the mother substrate 180 includes a total of nine units 190, three units 190 in the first direction D1 and three units 190 in the second direction D2. That is, 36 organic EL display devices 100 are manufactured using one mother substrate 180, in the example shown in the present embodiment. In addition, the configuration of the mother substrate 180 shown in FIG. 5 is merely an example and not limited to the configuration shown here. Since the 36 organic EL display devices 100 are manufactured in the same manner, the organic EL display device 100A shown in FIG. 5 will now be focused on while describing a method of forming the functional layer 148 of the organic EL display device 100A.

<1-3-2. Structure of Vapor Deposition Mask Unit 200 and Vapor Deposition Mask 202>

The vapor deposition mask unit 200 is used in a process of forming an organic EL element in the manufacturing process of the organic EL display device 100. Specifically, it is used in a step of forming the second layer 145 (the light-emitting layer 145R, the light-emitting layer 145G, and the light-emitting layer 145B) of the organic EL element using a vacuum deposition method.

As shown in FIG. 6, the vapor deposition mask unit 200 includes at least one vapor deposition mask 202, the support frame 208, and the connection portion 206. The support frame 208 corresponds to the size of the mother substrate 180, a mask pattern 204 corresponds to the individual organic EL display device 100 built into the mother substrate 180, and a plurality of openings 203 corresponds to the arrangement of the pixels 115 in the organic EL display device 100, in the vapor deposition mask unit 200. One vapor deposition mask 202 includes four mask patterns 204 and nine deposition masks 202 are fixed to the support frame via the connection portion 206, respectively, matching the mother substrate 180 including nine units 190 capable of forming four organic EL display devices 100 in one unit, in the embodiment shown in FIG. 6.

The connection portion 206 has a function of connecting the vapor deposition mask 202 and the support frame 208 and fixing them to each other. Therefore, although the support frame 208 is not in direct contact with the vapor deposition mask 202, the connection portion 206 is in contact with the vapor deposition mask 202 at a non-opening part (area where the mask pattern 204 is not formed) of the vapor deposition mask 202 and is in contact with a side surface of the support frame 208.

The vapor deposition mask 202 includes the plurality of openings 203, as shown in an inset magnified view of FIG. 6. The plurality of openings 203 is arranged in a predetermined area to form one mask pattern 204, in the vapor deposition mask 202. The vapor deposition mask 202 is connected to the connection portion 206 in the area where the mask pattern 204 is not formed, and is held by the support frame 208.

The vapor deposition mask 202 is a plate-like member, and the plurality of openings 203 are through holes that penetrate the plate-like member, as shown in FIG. 12. For example, the vapor deposition mask is formed using a metal material. The support frame 208 is arranged to support the vapor deposition mask 202 in a flat plate shape. A grid-like frame may be arranged on the support frame 208 to hold the plurality of deposition masks 202.

In addition, although the example shown in FIG. 6 shows a form in which nine deposition masks 202 are held in the support frame 208, the present embodiment is not limited to this example. In the vapor deposition mask unit 200, for example, one vapor deposition mask 202 may be held by the support frame 208 via the connection portion 206.

For example, the vapor deposition mask 202 and the connection portion 206 are formed using a 0-valent metal material such as nickel (Ni), copper (Cu), titanium (Ti), and chrome (Cr). That is, the vapor deposition mask 202 and the connection portion 206 each include a metal film. The deposition mask 202 and the connection portion 206 may have the same material composition.

Similar to the vapor deposition mask 202 and the connection portion 206, the support frame 208 is formed using a 0-valent metal material such as nickel (Ni), iron (Fe), cobalt (Co), chrome (Cr), and manganese (Mn). For example, the material composition of the support frame 208 may be an alloy containing iron (Fe) and chromium (Cr), or an alloy containing iron (Fe), nickel (Ni), and manganese (Mn), and the alloy may contain carbon (C).

The thickness of the vapor deposition mask 202 and the thickness of the connection portion 206 are exaggerated more than the actual thickness in order to facilitate understanding of the vapor deposition mask unit 200 of the present embodiment. For example, the actual thickness of the vapor deposition mask 202 is 3 μm or more and 20 μm or less. For example, the thickness of the connection portion 206 is 50 nm or more and 200 nm or less. For example, the thickness of the support frame 208 is 0.5 mm or more and 1.5 mm or less. Therefore, the thickness of the vapor deposition mask 202 and the thickness of the connection portion are sufficiently thinner than the thickness of the support frame 208. Therefore, in the case where a deposition area (the surface on which the insulating layer 142 is formed) on the mother substrate 180 side is arranged so as to align with the mask pattern 204 on the vapor deposition mask 202 side, the vapor deposition mask 202, the connection portion 206, and the support frame 208 are in contact with and fixed to the upper surface 118A of the second spacer 118 arranged in the second area 112.

Figure 7:
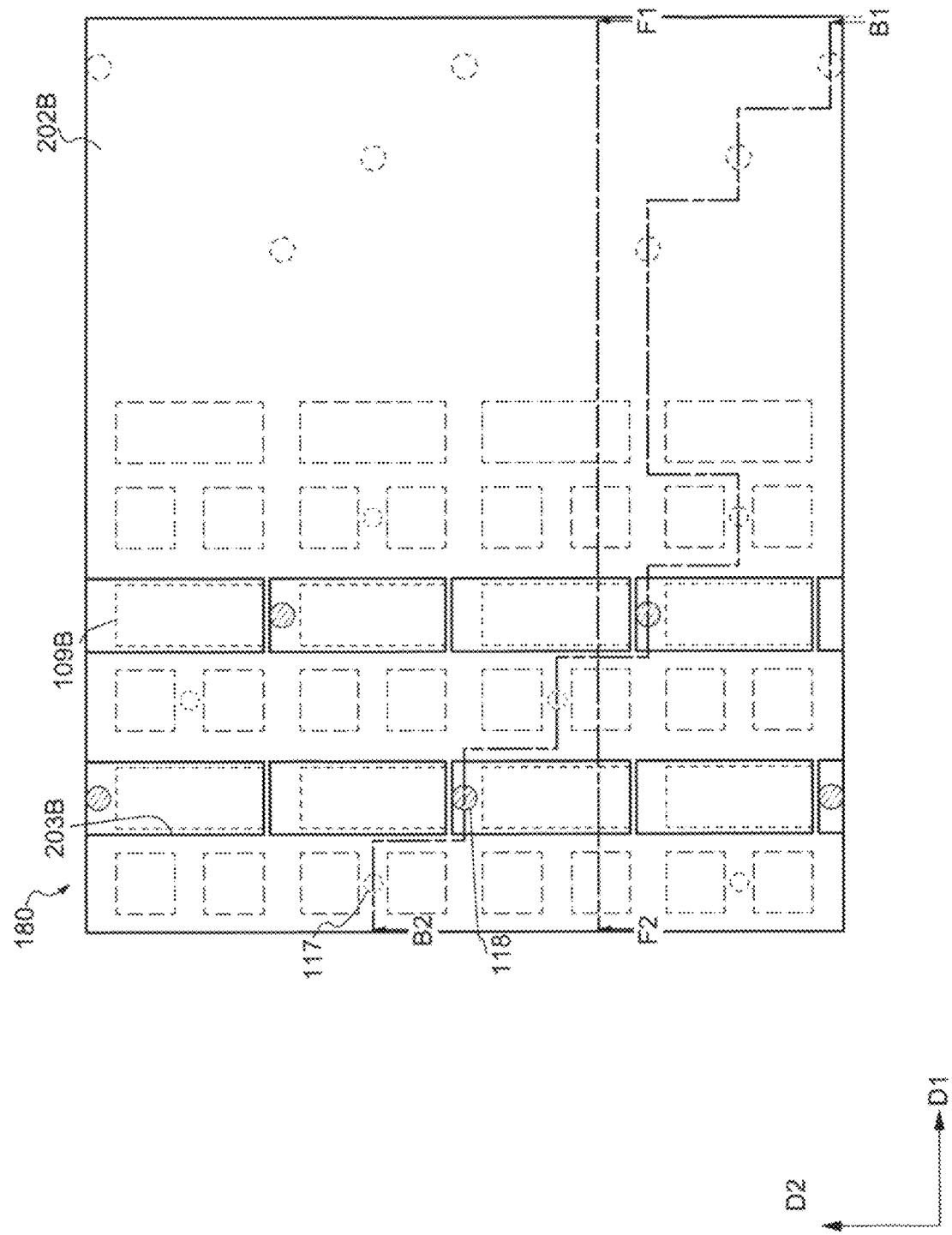
FIG. 7 is a schematic diagram showing an example of a deposition mask of an organic EL display device according to the first embodiment of the present invention.

FIG. 7 is a diagram showing an example of depositing the light-emitting layer 145B on the sub-pixel 109B (the pixel opening 195B) using a vapor deposition mask 202B. In FIG. 7, the vapor deposition mask 202B corresponding to an enlarged area of the display area 102 and the peripheral area 103 parts near the first side 191 of the organic EL display device 100A is shown. The vapor deposition mask 202B is a mask for depositing the light-emitting layer 145B on the sub-pixel 109B (the pixel opening 195B). The vapor deposition mask 202B includes a plurality of openings 203B in a part corresponding to the plurality of sub-pixels 109B (the pixel opening 195B).

In addition, FIG. 8 is a diagram showing an example of depositing the light-emitting layer 145G on the sub-pixel 109G (the pixel opening 195G) using a vapor deposition mask 202G. The vapor deposition mask 202G corresponding to an enlarged area of the display area 102 and the peripheral area 103 parts near the first side 191 of the organic EL display device 100A is shown in FIG. 8. The vapor deposition mask 202G is a mask for depositing the light-emitting layer 145G on the sub-pixel 109G (the pixel opening 195G). The vapor deposition mask 202G includes a plurality of openings 203G in a part corresponding to a plurality of sub-pixels 109G (the pixel opening 195G).

<1-3-3. Example of Method of Forming Functional Layer 148>

The array portion 170, the insulating layer 141, and the insulating layer 142 (the first spacer 117, the second spacer 118, and the third spacer 119) are stacked in this order on the first surface 101A, in the organic EL display device 100A shown in FIG. 9 and FIG. 10. In this case, as shown in FIG. 11, the partition wall 141A, the pixel opening 195R (not shown), the pixel opening 195G, and the pixel opening 195B are formed in the insulating layer 141. As shown in FIG. 10, the first layer 144 is formed on the upper layer of the insulating layer 142 after the insulating layer 142 is formed. An exposed portion of the insulating layer 141 (the partition wall 141A) shown in FIG. 11, the pixel opening 195R (not shown), the pixel opening 195G, and the pixel opening 195B are formed after the insulating layer 142 shown in FIG. 10 is formed. In addition, as shown in FIG. 11, the first layer 144 is formed on the upper layer of each of the exposed portion of the insulating layer 141 (the partition wall 141A), the pixel opening 195R (not shown), the pixel opening 195G, and the pixel opening 195B.

In addition, the configuration of the organic EL display device 100A is the same as that of the organic EL display device 100 described with reference to FIG. 1 to FIG. 4, and a detailed description thereof will be omitted here. In addition, since the array portion 170, the insulating layer 141, and the insulating layer 142 can be formed using, for example, photolithography used in the technical field of the display device, a detailed description thereof will be omitted here.

As shown in FIG. 10, in a cross-sectional view, the diameter of the bottom surface of the first spacer 117 is a length W1, the diameter of the upper surface 117A of the first spacer 117 is a length W2, the diameter of the bottom surface of the second spacer 118 is a length W3, and the diameters of the upper surface 118A and the upper surface 118B of the second spacer 118 are a length W4. The diameter of the bottom surface of the third spacer 119 is the length W1 similar to the diameter of the bottom surface of the first spacer 117, and the diameter of the upper surface 119A of the third spacer 119 is the length W2 similar to the diameter of the bottom surface of the first spacer 117. The length W1 is longer than the length W2, and the shape of the first spacer 117 and the shape of the third spacer 119 are trapezoidal. The length W3 is longer than the length W4, and the shape of the second spacer 118 is trapezoidal similar to the shape of the first spacer 117 and the shape of the third spacer 119.

Subsequently, the second layer 145 (the light-emitting layer) is formed on the upper layer of the first layer 144. In the step of forming the second layer 145, as shown in FIG. 12, the deposition area (the surface on which the insulating layer 142 is formed) on the mother substrate 180 side is arranged so as to align with the mask pattern 204 on the vapor deposition mask 202 side.

Specifically, as shown in the cross-sectional view (FIG. 13) along a line B1-B2 of FIG. 12, the mother substrate 180 is fixed to the vapor deposition mask unit 200. In this case, the second area 112 overlaps at least the vapor deposition mask 202B, the connection portion 206, and the support frame 208, and abuts the vapor deposition mask 202B. In addition, as described above, the thickness of the vapor deposition mask and the thickness of the connection portion 206 are sufficiently thinner than the thickness of the support frame 208. Therefore, in practice, the connection portion 206 and the support frame 208 may also abut and be fixed to the upper surface 118A of the second spacer 118 arranged in the second area 112.

Figure 14:
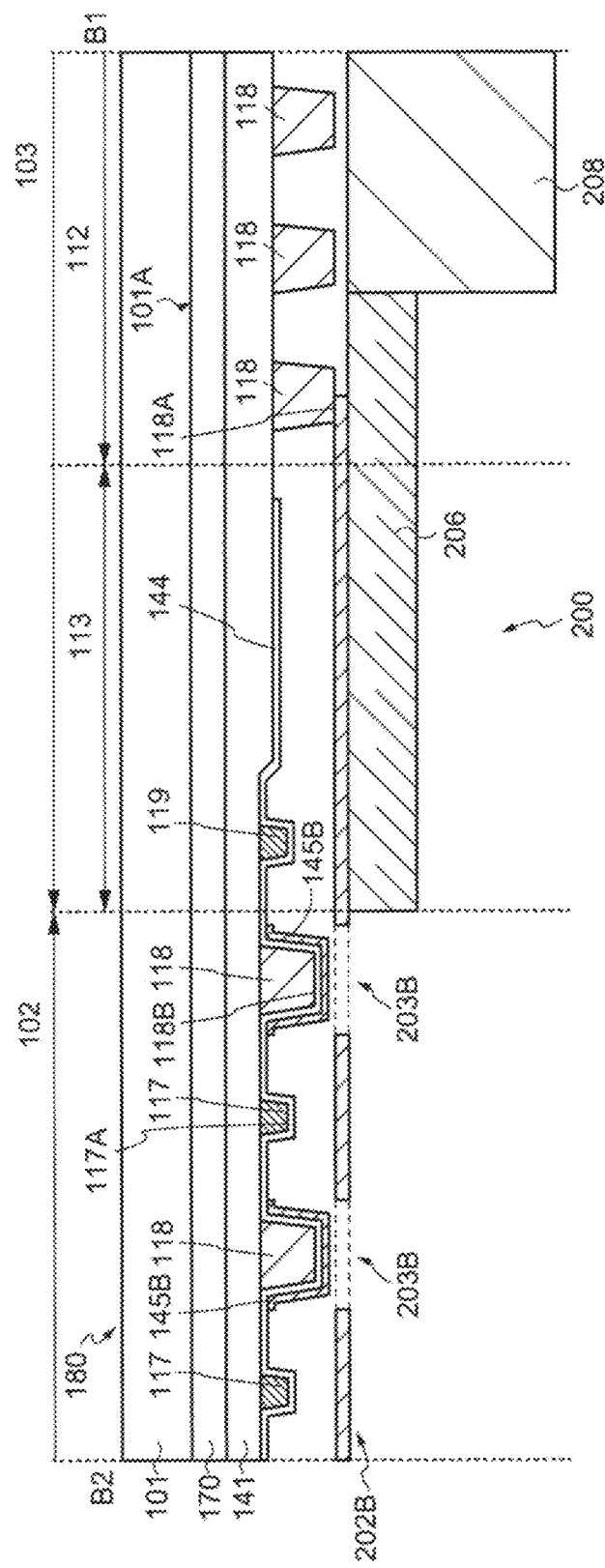
FIG. 14 is a schematic diagram showing an example of a manufacturing method of an organic EL display device according to the first embodiment of the present invention.
Figure 15:
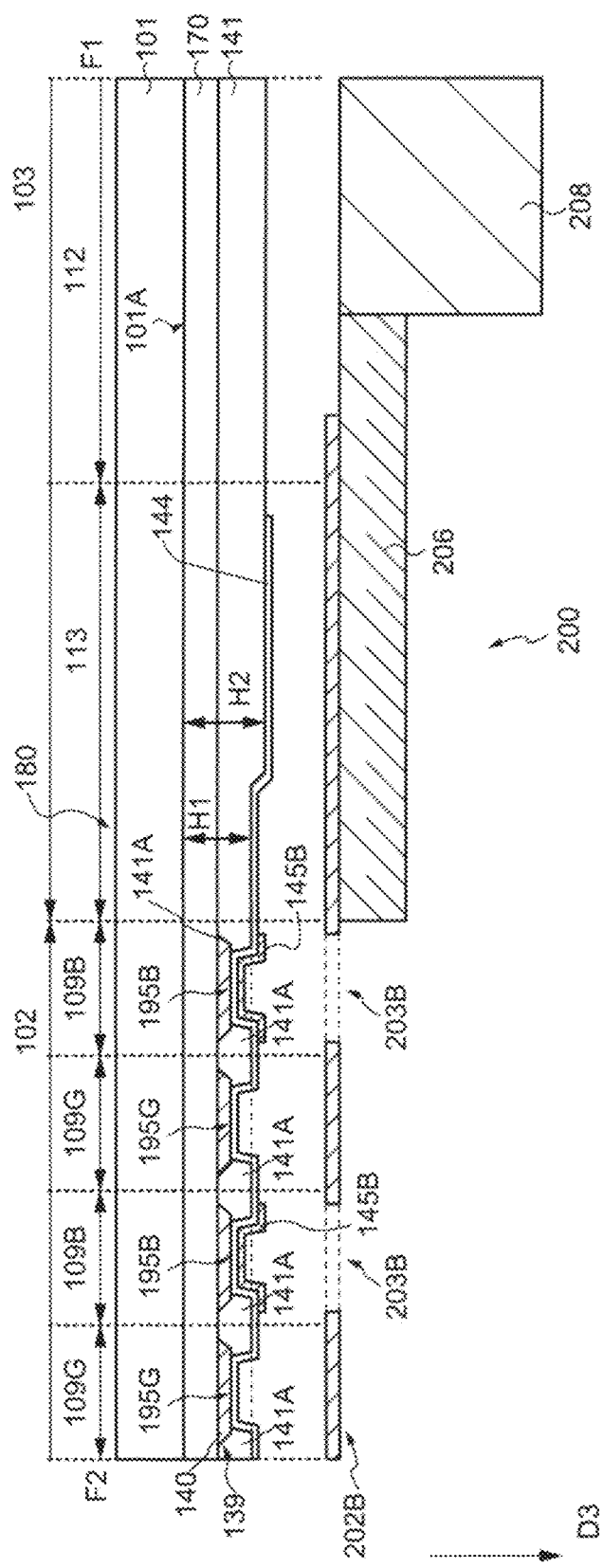
FIG. 15 is a schematic diagram showing an example of a manufacturing method of an organic EL display device according to the first embodiment of the present invention.

In forming the second layer 145, for example, as shown in FIG. 14, a deposition compound that forms the light-emitting layer 145B using the vapor deposition mask 202B passes through the plurality of openings 203B and deposits on the first layer 144 on the second spacer 118. In this case, as shown in FIG. 15, the deposition compound that forms the light-emitting layer 145B on the first layer 144 on the pixel opening 195B and the partition wall 141A is deposited, and the light-emitting layer 145B is formed. In addition, FIG. 14 is a cross-sectional view along a line B1-B2 of FIG. 7, and FIG. 15 is a cross-sectional view along a line F1-F2 of FIG. 7.

Figure 16:
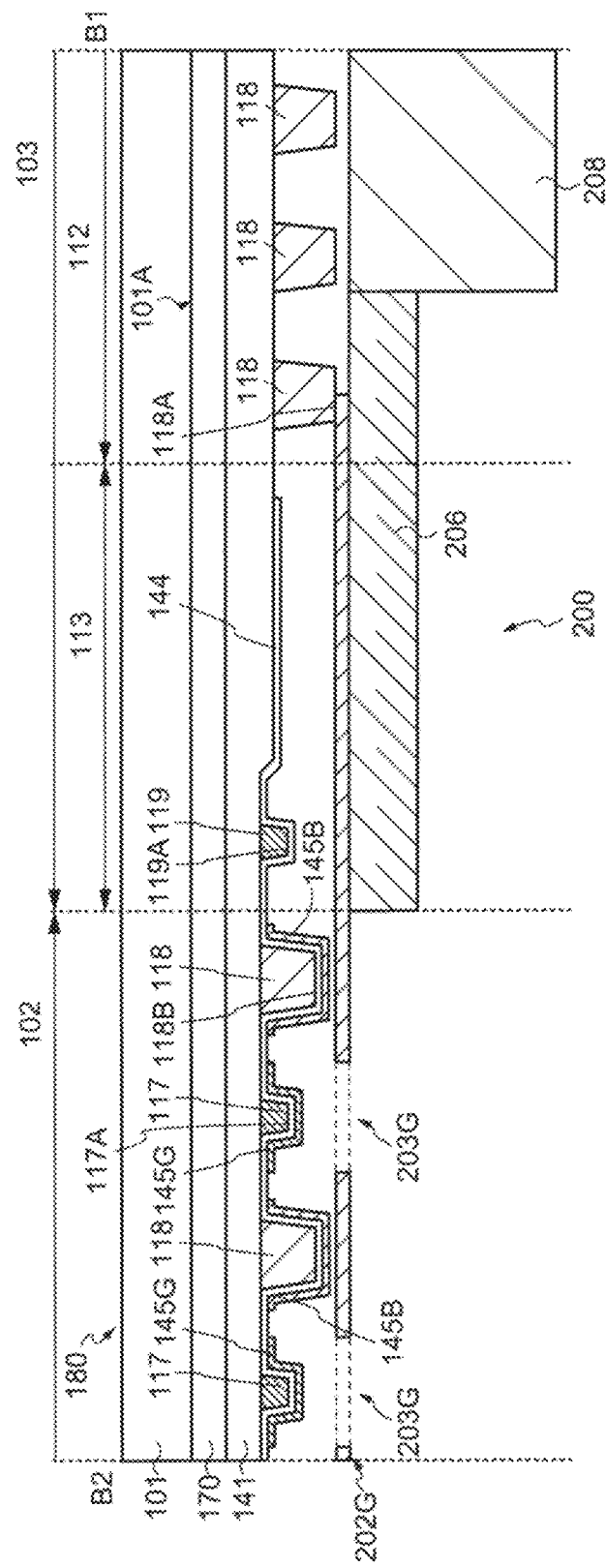
FIG. 16 is a schematic diagram showing an example of a manufacturing method of an organic EL display device according to the first embodiment of the present invention.
Figure 17:
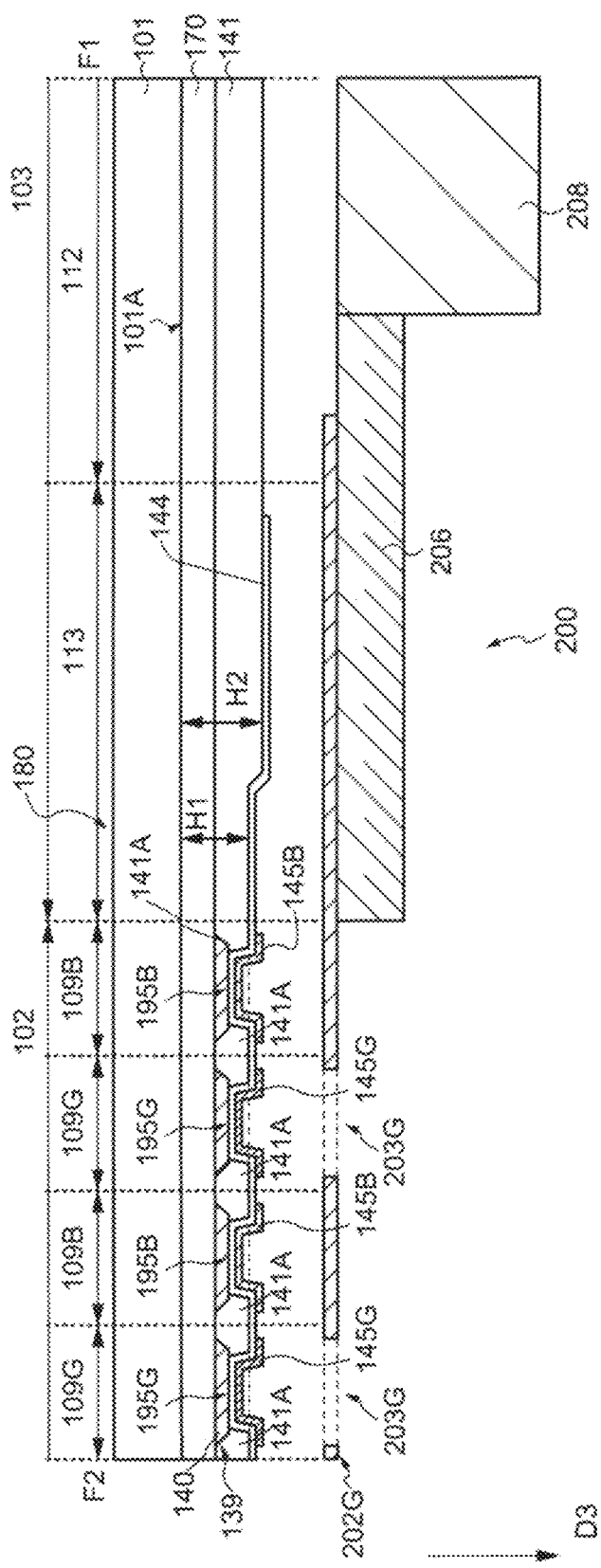
FIG. 17 is a schematic diagram showing an example of a manufacturing method of an organic EL display device according to the first embodiment of the present invention.

Following the formation of the light-emitting layer 145B, similar to the formation of the light-emitting layer 145B described with reference to FIG. 14 and FIG. 15, for example, as shown in FIG. 16 or FIG. 17, the deposition material that forms the light-emitting layer 145G using the vapor deposition mask 202G passes through the plurality of openings 203G and deposits on the first layer 144 on the first spacer 117 and on the first layer 144 on the pixel opening 195G and the partition wall 141A, and the light-emitting layer 145G is formed. In addition, similar to FIG. and FIG. 15, FIG. 16 is a cross-sectional view along a line B1-B2 of FIG. 7, and FIG. 17 is a cross-sectional view along a line F1-F2 of FIG. 7.

Following the formation of the light-emitting layer 145B, and the light-emitting layer 145G, the light-emitting layer 145R is formed. Similar to the method of forming the light-emitting layer 145B and the light-emitting layer 145G, the light-emitting layer 145R is formed using a deposition mask for forming the light-emitting layer 145R. Therefore, a detailed description thereof will be omitted.

In addition, the order of forming the light-emitting layer 145B, the light-emitting layer 145G, and the light-emitting layer 145R is not limited to the formation order of the present embodiment. The order of forming the light-emitting layer 145B, the light-emitting layer 145G, and the light-emitting layer 145R can be changed as appropriate depending on the configuration, application, and specification of the organic EL display device 100A.

In this case, in a comparative example, a method of forming the light-emitting layer 145G after forming the light-emitting layer 145B will be described. In the comparative example, as shown in FIG. 18, the third area 113 includes the second spacer 118. In the comparative example, when the vapor deposition mask unit 200 is arranged on the mother substrate 180 and fixed in the process of forming the light-emitting layer 145G, the vapor deposition mask unit 200 (the vapor deposition mask 202) contacts the first layer 144 at a contact portion 210. As a result, the first layer 144 deposited on the vapor deposition mask unit 200 is peeled off, and a display defect of the organic EL display device caused by the peeled light-emitting layer 145B occurs.

On the other hand, as described with reference to FIG. 1 to FIG. 17, since the third area 113 of the organic EL display device 100 includes the area that does not include the first spacer 117 and the second spacer 118, the vapor deposition mask unit 200 does not abut the third area 113. Therefore, in the manufacturing method of the organic EL display device 100, the peeling of the vapor deposition film deposited on the vapor deposition mask unit 200 is suppressed. As a result, in the organic EL display device 100, a display defect caused by the peeled vapor deposition film is suppressed, and a decrease in the manufacturing yield of the organic EL display device 100 is suppressed.

2. Second Embodiment

In a second embodiment, an example in which the first spacer 117, the second spacer 118, or the third spacer 119 that is different from the form shown in the first embodiment is arranged in the display area 102 and the peripheral area 103 will be described. The second embodiment is the same as the first embodiment except that the form of the first spacer 117, the second spacer 118, or the third spacer 119 in the display area and the peripheral area 103 is different. Therefore, the second embodiment will be described with reference to the drawings and symbols similar to those of the first embodiment. In addition, descriptions of the same or similar configurations as those in the first embodiment will be omitted in the second embodiment.

Figure 19:
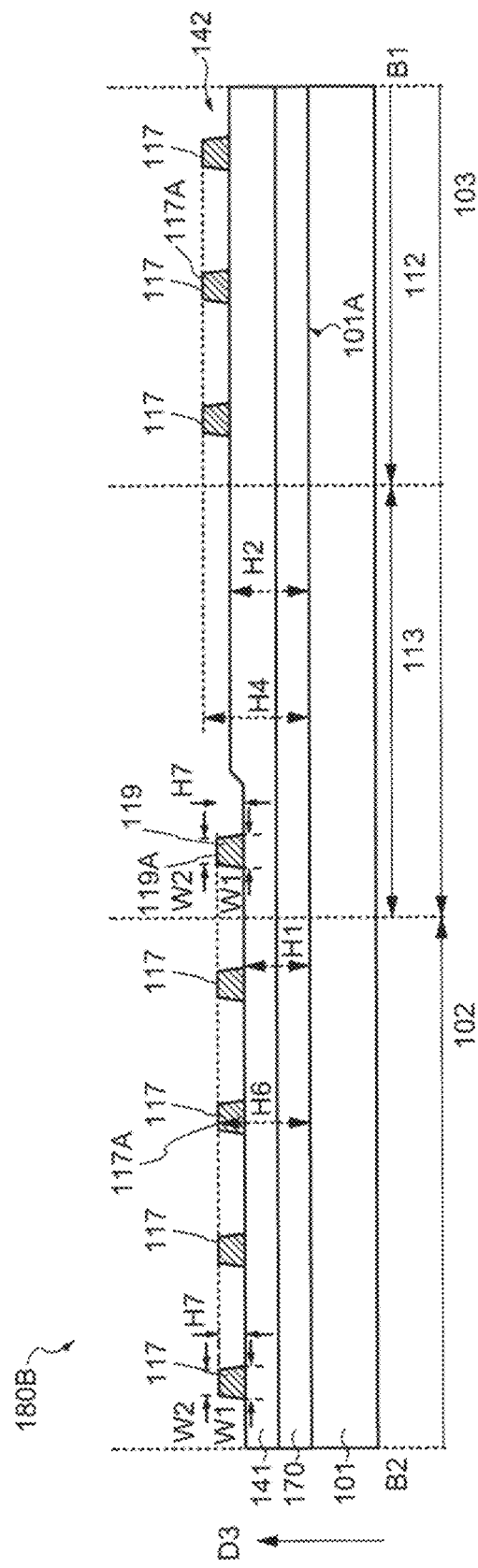
FIG. 19 is a schematic diagram showing a configuration of an organic EL display device according to a second embodiment of the present invention.
Figure 20:
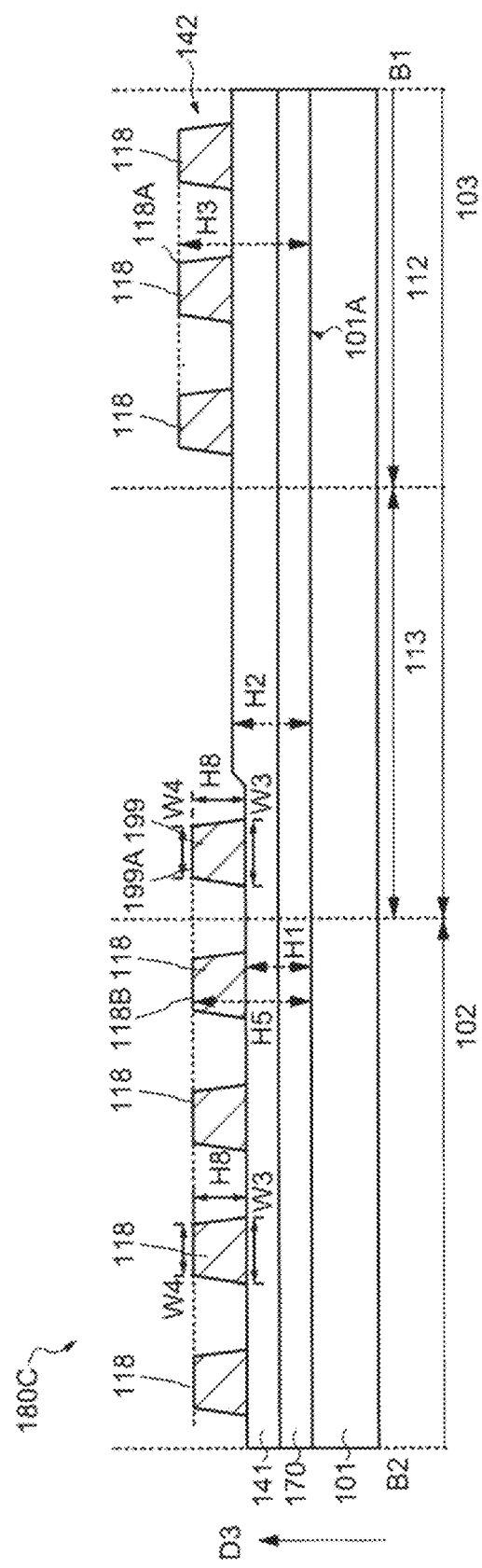
FIG. 20 is a schematic diagram showing a configuration of an organic EL display device according to the second embodiment of the present invention.

FIG. 19 and FIG. 20 are schematic diagrams showing a configuration of the organic EL display device 100A according to the second embodiment of the present invention. Specifically, in the organic EL display device 100A according to the second embodiment, a configuration in which the first spacer 117, the second spacer 118, or the third spacer 119 is arranged is shown.

FIG. 19 shows an example in which the insulating layer 142 is formed only of spacers having the same shape as the first spacer 117 with respect to FIG. 10 showing a stacked structure up to the insulating layer (the first spacer 117, the second spacer 118, and the third spacer 119) according to the first embodiment. As shown in FIG. 19, in the display area 102 and the second area, the insulating layer 142 includes only the first spacer 117. In addition, the insulating layer 142 in the third area 113 includes only the third spacer 119 and an area not including the spacer. In addition, the shape of the third spacer 119 is similar to the shape of the first spacer 117.

FIG. 20 shows an example in which the insulating layer 142 is formed only of spacers having the same shape as the second spacer 118 with respect to FIG. 10 showing a stacked structure up to the insulating layer 142 according to the first embodiment. As shown in FIG. 20, in the display area 102 and the second area, the insulating layer 142 includes only the second spacer 118. In addition, the insulating layer 142 in the third area 113 includes only a third spacer 199 and the area not including the spacer. In addition, the shape of the third spacer 199 is similar to the shape of the second spacer 118.

As shown in FIG. 19 or FIG. 20, in a cross-sectional view, the diameters of the bottom surfaces of the first spacer 117 and the second spacer 118, the diameter of the upper surface 117A of the first spacer 117, and the diameter of the bottom surface of the second spacer 118 are the same as those of the first embodiment. In addition, the height H1, the height H2, the height H4, the height H5, and the height H6 are also the same height as those of the first embodiment.

As shown in FIG. 19, in a cross-sectional view, the diameters of the bottom surfaces of the first spacer 117 and the third spacer 119, the diameter of the upper surface 117A of the first spacer 117, and the diameter of the upper surface 119A of the third spacer 119 are the same lengths (the length W1, the length W1, the length W2 and the length W2, respectively, the length W1>the length W2) as those of the first embodiment. In addition, the height H2, the height H4, the height H5, and the height H6 are the same height as those of the first embodiment.

The third area 113 of the organic EL display device 100 includes the area that does not include the first spacer 117 and the second spacer 118, in the configuration of the insulating layer 142 (the first spacer 117, the second spacer 118, the third spacer 119, and the third spacer 199) according to the second embodiment. Therefore, in the organic EL display device 100A according to the second embodiment, similar to the first embodiment, the vapor deposition mask unit 200 does not abut the third area 113, and a display defect caused by the peeled vapor deposition film is suppressed, and a decrease in the manufacturing yield of the organic EL display device 100 is suppressed.

Each of the embodiments or a part of each of the embodiments described above as an embodiment of the present invention can be appropriately combined and implemented as long as no contradiction is caused.

It is understood that, even if the effect is different from those provided by each of the above-described embodiments, the effect obvious from the description in the specification or easily predicted by persons ordinarily skilled in the art is apparently derived from the present invention.

What is claimed is:

1. An organic electroluminescence display device comprising:
   a substrate including a first surface;
   a first area arranged on the first surface and including one or more first spacers and a plurality of pixels each including a light-emitting layer;
   a third area arranged on the first surface, surrounding the first area, and not including spacers, and
   a second area arranged on the first surface, surrounding the third area, and including one or more second spacers,
   wherein
   the plurality of pixels each including the light-emitting layer is arranged along a first direction and a second direction intersecting the first direction,
   a length of the third area in the first direction is a total length of pitches for at least two pixels,
   a height between the first surface and an upper surface of the second spacer is higher than a height between the first surface and an upper surface of the first spacer in a side view,
   the first spacers include a spacer having a first height between the first surface and an upper surface of the first spacer and a spacer having a second height between the first surface and the upper surface of the first spacer, and
   the first height is higher than the second height.

2. The organic electroluminescence display device according to claim 1, wherein
   the third area does not include the light-emitting layer and includes a first layer arranged between the light-emitting layer and the first surface.

3. The organic electroluminescence display device according to claim 1, wherein
   a density of wirings arranged in the third area is higher than a density of wirings arranged in the first area.

4. The organic electroluminescence display device according to claim 1, wherein
   the plurality of pixels each including a light-emitting layer includes a first pixel having a first light-emitting layer, a second pixel having a second light-emitting layer, and a third pixel having a third light-emitting layer, and
   the first light-emitting layer, the second light-emitting layer and the third light-emitting layer emit light in different colors.

5. The organic electroluminescence display device according to claim 4, wherein
   the first spacer of the first height is arranged between the third pixel and a third pixel adjacent to the third pixel, and
   the first spacer of the second height is arranged between the first pixel and the second pixel.

6. An organic electroluminescence display device comprising:
   a substrate including a first surface;
   a first area arranged on the first surface and including one or more first spacers and a plurality of pixels each including a light-emitting layer;
   a third area arranged on the first surface, surrounding the first area, and not including spacers; and
   a second area arranged on the first surface, surrounding the third area, and including one or more second spacers,
   wherein
   the plurality of pixels each including the light-emitting layer is arranged along a first direction and a second direction intersecting the first direction,
   a length of the third area in the first direction is a total length of pitches for at least two pixels,
   the first area further includes one or more second spacers,
   the first spacers and the second spacers arranged in the first area and the second spacers arranged in the second area are arranged on the same layer,
   in a plan view,
   a first group includes the first spacers in the first area and the second spacers in the second area, arranged on the same line parallel to the first direction,
   a second group includes the second spacers in the first area and the second spacers in the second area, arranged on the same line parallel to the first direction,
   the first group and the second group are arranged alternately,
   a third group includes the first spacers arranged on the same line parallel to the second direction,
   a fourth group includes the second spacers in the first area arranged on the same line parallel to the second direction, and
   the third group and the fourth group are arranged alternately.

7. The organic electroluminescence display device according to claim 6, wherein
   a height between the first surface and an upper surface of the second spacer is higher than a height between the first surface and an upper surface of the first spacer in a side view.

8. The organic electroluminescence display device according to claim 6, wherein
   the third area does not include the light-emitting layer and includes a first layer arranged between the light-emitting layer and the first surface.

9. The organic electroluminescence display device according to claim 6, wherein
   a density of wirings arranged in the third area is higher than a density of wirings arranged in the first area.

10. An organic electroluminescence display device comprising:
    a substrate including a first surface;
    a first insulating layer on a side of the first surface of the substrate, the first insulating layer including an upper surface on an opposite side of the first surface of the substrate;
    a first area arranged on the upper surface of the first insulating layer and including one or more first spacers and a plurality of pixels each including a light-emitting layer;
    a third area arranged on the upper surface of the first insulating layer, surrounding the first area, and not including spacers; and
    a second area arranged on the upper surface of the first insulating layer, surrounding the third area, and including one or more second spacers,
    wherein the plurality of pixels each including the light-emitting layer is arranged along a first direction and a second direction intersecting the first direction, a length of the third area in the first direction is a total length of pitches for at least two pixels, and the first spacers and the second spacers are in direct contact with the upper surface of the first insulating layer.

11. The organic electroluminescence display device according to claim 10, wherein a height between the first surface and an upper surface of the second spacer is higher than a height between the first surface and an upper surface of the first spacer in a side view.

12. The organic electroluminescence display device according to claim 10, further comprising:

a second insulating layer on the first insulating layer, wherein the second insulating layer includes the first spacers and the second spacers.

13. The organic electroluminescence display device according to claim 10, wherein each of the plurality of pixels further includes a pixel electrode, and the first insulating layer covers an end portion of the pixel electrode.

14. The organic electroluminescence display device according to claim 10, wherein each of the plurality of pixels further includes
a pixel electrode on the first insulating layer and
a first organic layer between the pixel electrode and the light-emitting layer, the third area includes a plurality of dummy pixels, each of the plurality of dummy pixels includes the pixel electrode and the first organic layer, and each of the plurality of dummy pixels does not include the light-emitting layer.

15. The organic electroluminescence display device according to claim 14, wherein the plurality of dummy pixels does not display an image.

* * * * *